US012737220B1

(12) United States Patent
Huynh et al.

(10) Patent No.: US 12,737,220 B1
(45) Date of Patent: Sep. 15, 2026

(54) SUPER-AGENT SYSTEM

(71) Applicants: Vu Anh Huynh, Doral, FL (US); Hai Thai Dang, San Jose, CA (US)

(72) Inventors: Vu Anh Huynh, Doral, FL (US); Hai Thai Dang, San Jose, CA (US)

( * ) Notice: Subject to any disclaimer, the term of this patent is extended or adjusted under 35 U.S.C. 154(b) by 0 days.

(21) Appl. No.: 19/424,156

(22) Filed: Dec. 18, 2025

(51) Int. Cl.
*G06F 9/48* (2006.01)
*G06F 9/50* (2006.01)
*G06N 3/0475* (2023.01)

(52) U.S. Cl.
CPC .......... *G06F 9/4881* (2013.01); *G06F 9/5038* (2013.01); *G06N 3/0475* (2023.01)

(58) Field of Classification Search
None
See application file for complete search history.

(56) References Cited

U.S. PATENT DOCUMENTS

2021/0373947 A1* 12/2021 Kweon ................ G06F 9/4843
2024/0362495 A1* 10/2024 Farrahi Moghaddam .................. G06N 3/063
2025/0368219 A1* 12/2025 Thompson, III .... B60W 60/001
2025/0370731 A1* 12/2025 Agarwal .................. G06F 8/35

* cited by examiner

*Primary Examiner* — Eric C Wai

(57) ABSTRACT

A computer-implemented method includes performing the following operations: receiving a system input indicating a task; processing the system input, using a super-agent including a super-agent model that is a replica of a root model, to obtain a current sub-agent team configuration including multiple sub-agent configurations and a dependency graph; for each sub-agent configuration, initializing, a sub-agent including a sub-agent model that is a replica of the root model; performing the following steps for one or more times until at least one value of at least one metric exceed at least one threshold value: providing an execution instruction from the super-agent to the sub-agents, generating, using the sub-agents based on the execution instruction and the dependency graph, a team output that represents a response to the task, and updating, based on the team output, the at least one value; and returning the team output as a system output.

24 Claims, 6 Drawing Sheets

SUPER-AGENT SYSTEM

BACKGROUND

Machine-learning-based agents employ machine-learning models to analyze input data and determine outputs or actions in accordance with predefined objectives. These agents may interpret natural language instructions and perform multi-step operations in response to user instructions. For example, these agents may help users draft documents, manage schedules, retrieve relevant information, and interact with online platforms.

SUMMARY

This disclosure describes a super-agent system that includes a super-agent configured to dynamically set up a team of sub-agents for performing a task. The super-agent and the team of sub-agents share the same root model.

In general, one innovative aspect of the subject matter described in this specification can be embodied in a computer-implemented method performed by one or more computers for generating a system output for a system input. The method includes performing the following task operations: receiving a system input indicating a task; processing, using a super-agent including a super-agent model, the system input to obtain a current sub-agent team configuration for performing the task, wherein the super-agent model is a replica of a root model, and wherein the current sub-agent team configuration includes (i) a plurality of sub-agent configurations and (ii) a dependency graph; for each sub-agent configuration in the plurality of sub-agent configurations, initializing, a respective sub-agent configured based on the sub-agent configuration, wherein the respective sub-agent includes a respective sub-agent model that is a respective replica of the root model, wherein the dependency graph represents an order of executions performed by the plurality of sub-agents to perform the task; performing the following steps for one or more times until at least one value of at least one metric meets at least one threshold value: providing an execution instruction from the super-agent to the plurality of sub-agents, generating, using the plurality of sub-agents based on the dependency graph and the execution instruction, a team output that represents a response to the task, and updating, based on the team output, the at least one value of the at least one metric; and returning the team output as the system output.

In some implementations, the root model is a generative neural network.

In some implementations, the task includes at least one generative task of a plurality of generative tasks including: a natural language understanding task, a reasoning task, a coding task, a software engineering task, a web-browsing task, a reinforcement learning task, a robotic control task, a planning and decision-making task, a research task, a dialogue and multi-turn interaction task, a tool-use task, a safety evaluation task, a multi-modal reasoning task, a career planning task, a financial planning task, a real estate planning task, a shopping planning task, an education planning task, an entertainment recommendation task, a travel planning task, and a business task.

In some implementations, the method includes performing the task operations at each iteration of a plurality of iterations, in which at each iteration, the system input includes a task context that include: a team setup request to load or modify a sub-agent team configuration, an initial instruction to execute the task, and historical information of one or more previous system inputs, previous system outputs, and executions performed by the super-agent and a plurality of previous sub-agents from one or more previous iterations in the plurality of iterations.

In some implementations, providing, using the super-agent, the execution instruction to the plurality of sub-agents includes: generating, using the super-agent based on the initial instruction, the execution instruction, and providing the execution instruction to the plurality of sub-agents.

In some implementations, each sub-agent configuration in the plurality of sub-agent configurations includes a sub-agent model description, a sub-agent prompt, and a sub-agent tools description.

In some implementations, the sub-agent model description includes a description of the root model.

In some implementations, the sub-agent model description includes a description of a model specified by the super-agent.

In some implementations, each sub-agent in the plurality of sub-agents includes: one or more sub-agent tools, a sub-agent prompt indicating (i) a role and expertise of the sub-agent, (ii) one or more behavioral directives for the sub-agent, (iii) instructions for using the one or more sub-agent tools, and (iv) instructions for communicating and working with other sub-agents, and a sub-agent memory; and each sub-agent in the plurality of sub-agents may be configured to access a shared memory.

In some implementations, the dependency graph includes: a plurality of nodes, each node representing a sub-agent in the plurality of sub-agents, and a plurality of edges, in which each edge in the plurality of edges connects two nodes in the plurality of nodes and specifies a communication protocol between two sub-agents represented by the two nodes, and in which the dependency graph specifies, for each sub-agent represented by a corresponding node, at least one of (i) one or more parent nodes representing one or more preceding sub-agents that are configured to complete their executions before the sub-agent begins its executions, or (ii) one or more child nodes representing one or more succeeding sub-agents that are configured to receive outputs of the sub-agent as inputs.

In some implementations, the dependency graph includes: a plurality of super-nodes, in which each super-node in the plurality of super-nodes includes one or more nodes in the plurality of nodes and represents an organization of one or more sub-agents represented by the one or more nodes, and a plurality of super-edges, in which each super-edge in the plurality of super-edge connects two super-nodes in the plurality of super-nodes and specifies a communication protocol between two organizations represented by the two super-nodes.

In some implementations, the plurality of sub-agents includes a plurality of working sub-agents, a verifying sub-agent, a conflict-resolving sub-agent, and a presenting sub-agent, and generating, using the plurality of sub-agents based on the dependency graph and the execution instruction, the team output that represents the response to the task includes:

- receiving, using the plurality of working sub-agents, the execution instruction from the super-agent,
- initializing, using each working sub-agent of the plurality of working sub-agents, a temporary output,
- performing the following steps for one or more times until one or more values of one or more check criteria are satisfied:
  - repeating the following updating steps for a plurality of update times: processing, using each working sub-agent of the plurality of working sub-agents according to the sub-agent prompt of the working sub-agent and following the order of executions represented by the dependency graph, the execution instruction to update the temporary output of the working sub-agent, and obtaining, for each working sub-agent of the plurality of working sub-agents, a response to the task based on the updated temporary output of the working sub-agent, and updating, using the verifying agent based on the responses from the plurality of working sub-agents, the one or more values of the one or more check criteria, and processing, using the presenting sub-agent, the responses from the plurality of working sub-agents to generate the team output.

In these implementations, each sub-agent in the plurality of the sub-agents is configured to store its execution data in the sub-agent memory of the sub-agent, and each sub-agent in the plurality of the sub-agents is configured to update the temporary output of the sub-agent based on data in both the sub-agent memory of the sub-agent and the shared memory.

In some implementations, the temporary output of each working sub-agent includes a partial response to the task, and wherein repeating the updating steps for the plurality of update times includes: detecting, using the verifying agent, conflicting partial responses of two or more temporary outputs from the temporary outputs, in response to a detection of the conflicting partial responses, generate, using a conflict-resolving sub-agent, a course of action to address the conflicting partial responses, and communicating the course of action to two or more working sub-agents associated with the conflicting partial responses.

In some implementations, the course of action to address the conflicting partial responses includes one of: resolving, using the conflict-resolving sub-agent, the conflicting partial responses to generate a resolution, or deferring, using the conflict-resolving sub-agent, resolving the conflicting partial responses to the next update time, in which the conflict-resolving sub-agent is configured to defer resolving the same conflicting partial responses up to a predetermined number of times.

In some implementations, repeating the updating steps for the plurality of update times includes: determining, by the verifying sub-agent, that a temporary output in the temporary outputs has a quality exceeding a threshold quality, and writing the determined temporary output to the shared memory accessible to the plurality of sub-agents in the next update time.

In some implementations, the task operations further include: initializing, using the super-agent, a baseline agent to execute the same task indicated by the system input; processing, using the super-agent, the system input to generate a baseline execution instruction; and executing, using the baseline agent, the baseline execution instruction to generate a baseline output. In these implementations, updating, based on the team output, the at least one value of the at least one metric includes: updating, using a response benchmarking engine, the at least one value of the at least one metric based on the team output and the baseline output, and when the at least one value of the at least one metric does not exceed the at least one threshold value, updating, using the super-agent, the sub-agent team configuration.

In some implementations, executing, using the baseline agent, the baseline execution instruction to generate the baseline output includes: receiving an external benchmark for the task, and processing, using the baseline agent, the external benchmark to generate the baseline output.

In some implementations, the external benchmark is one of a ground-truth output for the task or user feedback.

In some implementations, the method includes:

performing the task operations at each iteration of a plurality of iterations, training the root model on a training dataset using a machine learning technique to update values of parameters of the root model, wherein the training dataset includes a plurality of training samples, wherein each training sample is associated with a previous iteration and includes:

a previous system input and a previous system output, a previous sub-agent team configuration including a previous plurality of sub-agent configurations, and a previous dependency graph, previous execution data of (i) the super-agent, (ii) a previous plurality of sub-agents, and (iii) a previous baseline agent, and a comparison between a previous team output and a previous baseline output, and sending the updated values of parameters of the root model to each sub-agent of the plurality of sub-agents to update the respective replica of the root model associated with the sub-agent.

In some implementations, the machine learning technique is a supervised learning technique, a self-supervised training technique, an unsupervised training technique or a semi-supervised training technique.

In some implementations, the machine learning technique is a reinforcement learning technique. In these implementations, the reinforcement learning technique includes computing rewards for the super-agent and for each sub-agent of the plurality of sub-agents based on the dependency graph.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

Another innovative aspect of the subject matter described in this specification can be embodied in a system that includes: one or more computers; and one or more storage devices communicatively coupled to the one or more computers, in which the one or more storage devices store instructions that, when executed by the one or more computers, cause the one or more computers to perform the following operations at each of one or more iterations: receiving a system input indicating a task; processing, using a super-agent including a super-agent model, the system input to obtain a current sub-agent team configuration for performing the task, wherein the super-agent model is a replica of a root model, and wherein the current sub-agent team configuration includes (i) a plurality of sub-agent configurations and (ii) a dependency graph; for each sub-agent configuration in the plurality of sub-agent configurations, initializing, a respective sub-agent configured based on the sub-agent configuration, wherein the respective sub-agent includes a respective sub-agent model that is a respective replica of the root model, wherein the dependency graph represents an order of executions performed by the plurality of sub-agents to perform the task; performing the following steps for one or more times until at least one value of at least one metric exceed at least one threshold value: providing an execution instruction from the super-agent to the plurality of sub-agents, generating, using the plurality of sub-agents based on the dependency graph and the execution instruction, a team output that represents a response to the task, and updating, based on the team output, the at least one value of the at least one metric; and returning the team output as a system output.

Another innovative aspect of the subject matter described in this specification can be embodied in one or more non-transitory computer-readable storage media storing instructions that, when executed by one or more computers, cause the one or more computers to perform the following operations at each of one or more iterations: receiving a system input indicating a task; processing, using a super-agent including a super-agent model, the system input to obtain a current sub-agent team configuration for performing the task, wherein the super-agent model is a replica of a root model, and wherein the current sub-agent team configuration includes (i) a plurality of sub-agent configurations and (ii) a dependency graph; for each sub-agent configuration in the plurality of sub-agent configurations, initializing, a respective sub-agent configured based on the sub-agent configuration, wherein the respective sub-agent includes a respective sub-agent model that is a respective replica of the root model, wherein the dependency graph represents an order of executions performed by the plurality of sub-agents to perform the task; performing the following steps for one or more times until at least one value of at least one metric exceed at least one threshold value: providing an execution instruction from the super-agent to the plurality of sub-agents, generating, using the plurality of sub-agents based on the dependency graph and the execution instruction, a team output that represents a response to the task, and updating, based on the team output, the at least one value of the at least one metric; and returning the team output as a system output.

Various embodiments of the subject matter described in this specification can be implemented so as to realize one or more of the following technical advantages.

This specification describes a super-agent system that can delegate a task to a team of multiple sub-agents that communicate and work with each other based on execution order defined by a dependency graph generated by the super-agent. By maintaining replicas of a single root model as the agent models for both the super-agent and the multiple sub-agents, the described techniques require training only the root model rather than training multiple different models (i.e., training one model for each agent as existing multi-agent systems do). As a result, the described super-agent system requires significantly less computational resources and time for training in comparison to existing multi-agent systems that train multiple models. The reductions in training computational resources and training time are proportional to the number of agents. For example, compared to a multi-agent system that has ten agents, the described techniques can reduce the training computational resources and training time by up-to ten times.

This unified training approach also simplifies system complexity because updates to the root model automatically propagate to all sub-agent models during training. As a result, the disclosed techniques eliminate the amount of computing resources and network bandwidth that would otherwise be required by existing multi-agent systems for synchronization, coordination or alignment among multiple agents.

Further, compared to existing multi-agent systems, the centralized learning for the root model as described herein also facilitates more stable, faster convergence and hence shorter training time, because all sub-agent behaviors evolve from a common parameter set rather than from independently trained models that may learn conflicting policies.

In addition, the use of the single root model across all agents further improves scalability for larger and more complex tasks, since additional sub-agents can be instantiated, as described herein, without incurring the cost of designing or initializing new model architectures as in existing multi-agent systems.

The techniques described in this specification can generate outputs having higher quality than existing multi-agent systems.

First, as discussed above, with more stable training convergence, the described techniques also offer higher performance in tasks during inference. That is, the described super-agent system consistently delivers high-quality outputs across a wide range of inputs, reducing variability and improving overall output fidelity.

Second, by incorporating a verifying sub-agent and a conflict-resolving sub-agent, the super-agent system can substantially improve the quality of generated outputs in comparison to existing multi-agent systems. Specifically, the verifying sub-agent is configured to identify a high-quality partial response produced by one of the sub-agents and then broadcasts this information to the entire team via a shared memory. By integrating this high-quality partial response into all sub-agents' subsequent reasoning, all sub-agents can generate higher-quality partial responses in the next execution iterations and substantially accelerate the generation of their final outputs. At the same time, the verifying sub-agent is configured to identify conflicting partial responses from a subset of sub-agents and to delegate a resolution to the conflict-resolving sub-agent. This collaboration reduces inconsistencies early, substantially improving the quality of the final system output. Furthermore, resolving conflicts at an early stage prevents cascading errors and unnecessary repeated computations, resulting in more efficient use of resources for long and/or complex tasks.

Third, by using a baseline agent and a response benchmarking engine, the described super-agent system can generate outputs with higher quality while spending less computational resources compared to existing multi-agent systems. In particular, existing multi-agent systems often have fixed prompts for their agents during execution. These fixed prompts have to be adjusted manually, and the agents in these multi-agent systems need to be reset and re-configured to re-run the task from scratch, leading to wasted computational resources when their prompts are changed. Despite regenerating the output from scratch, existing multi-agent systems may still produce a new output that does not have improved quality.

In contrast, in the super-agent system described here, the baseline agent can generate a baseline output to compare with the team output generated by the sub-agent team. The baseline output is an output that meets or exceeds a quality threshold. The baseline agent can be a previous version of the super-agent or a third-party agent. In some implementations, the baseline agent can have access to external benchmarks such as a ground-truth output to generate the baseline output. The response benchmarking engine is configured to compare the baseline output and the team output to determine if the team output should be revised to improve quality. The revision process includes automatically changing the prompts of sub-agents in the sub-agent team in response to the feedback from the response benchmarking engine. This revision process in the described super-agent system automatically and incrementally provides improved prompts to the sub-agents during the execution of the task without going through a training phase, reset and reconfiguration of the sub-agents, or re-running the task from scratch. In particular, the sub-agents in the super-agent system continue to refine the current team output based on a historical task execution context and the feedback from the response benchmarking engine to generate a new team output with higher quality. As a result, by automatically and incrementally changing sub-agents' prompts during inference, the described super-agent system can improve the quality of team outputs without wasting computational resources and without waiting for a long training period to improve output quality.

The described super-agent system also offers great flexibility in setting up the team structure using the dependency graph, leading to considerable saving in computational resources and higher quality outputs than existing multi-agent systems.

First, when processing a new task, existing multi-agent systems often need to set up and configure a new set of agents from scratch. In contrast, the described super-agent system is configured to process a system input including a task context that includes a team setup request to load or modify a sub-agent team configuration. Thus, instead of starting from scratch, the described super-agent system can load or modify a previously saved sub-agent team configuration from a previous related task to perform the current task indicated by the system input. As a result, the described super-agent system can reduce computational resources to set up a team of sub-agents for executing the task.

Second, by employing a dependency graph that can have super-nodes and super-edges that represent an organizational structure of an entity (e.g., finance, marketing, and engineering departments in a company), the described super-agent system can achieve higher-quality outputs with lower computational cost and more predictable convergence behavior in comparison to existing multi-agent systems. In particular, existing multi-agent systems typically rely on flat or loosely structured agents, which often lead to redundant computation, inefficient use of computational resources, and unstable or non-improving output quality despite repeated generation.

In contrast, in the described super-agent system, an organizationally mapped sub-agent architecture, encoded by the dependency graph, provides explicit role specialization with well-defined responsibility boundaries, thereby reducing redundant reasoning and improving output consistency. The hierarchical coordination structure enables controlled information flow, decision escalation, and stable convergence, while avoiding the combinatorial complexity associated with fully connected agent interactions. The modular design permits individual agents to be independently replaced, versioned, or upgraded without disrupting system-wide operation, thereby improving maintainability and extensibility. Additionally, the architecture enhances traceability and governance by enabling precise credit assignment, policy enforcement, and auditability at the level of individual organizational roles. By constraining agent interactions through organizational roles and hierarchical coordination, the disclosed super-agent system achieves higher-quality outputs with lower computational cost and more predictable convergence behavior.

By using multiple sub-agents, the techniques described herein can perform a task in a more computationally efficient manner than existing single agent systems. In particular, existing single agent systems often attempt to coordinate many different tool calls or knowledge retrieval tasks using a long prompt. When agents employ generative neural networks such as large language models (LLMs) with attention mechanisms, the computational cost of processing a prompt using the attention mechanisms grows quadratically with the prompt length. Thus, existing single agent systems require substantial computing resources to process the long prompt. In contrast, in the described super-agent system, a team of multiple sub-agents that coordinate with each other based on a dependency graph can decompose a complex task into smaller, more manageable sub-tasks by allowing each sub-agent to focus only on the information relevant to its specialization. Distributing the work across multiple sub-agents results in shorter prompts for each sub-agent and, therefore, substantially reduces the overall computational requirements needed to solve the task compared to a single-agent approach.

In addition, for a reasoning and planning task over a long horizon such as travel planning, career planning, and investment planning, existing single agent systems often process an entire input and make decisions over a vast action space, which can grow exponentially as the planning horizon becomes longer. Existing single agent systems therefore need intensive computational resources for this type of tasks. In contrast, by using a team of sub-agents that coordinate with each other via a dependency graph, the super-agent system described in this specification can distribute the workload so that each sub-agent processes only a portion of the overall input. By reducing the size of the action space that any sub-agent must handle, the described techniques can significantly reduce both memory usage and per sub-agent computational effort. As a result, the total computational resources required by the described super-agent system to complete the task are significantly lower than those needed by existing single-agent systems. Moreover, from a computational complexity perspective, a problem that requires $O(N^3)$ computation (where N is the size of the problem) when handled centrally can instead be divided among k sub-agents, each solving a smaller subproblem of size N/k, leading to $O((N/k)^3)$ complexity per sub-agent and a substantial overall reduction in computation.

By using multiple sub-agents, the described super-agent system can generate higher-quality outputs than existing single-agent systems. When generative neural networks such as LLMs with Mixture-of-Expert (MOE) architectures are used, existing single agent systems may not activate a sufficiently diverse set of neurons to capture the full range of perspectives needed for generating an output for a task. This is due to the fact that MOE architectures in a single agent often activate only a subset of experts during inference. In contrast, the described super-agent system can dynamically construct prompts for a coordinated team of sub-agents, enabling each sub-agent to activate a different subset of experts within the underlying root model. Together, the team of sub-agents can activate multiple subsets of experts to capture the full range of perspectives needed for the task. The resulting breadth and complementarity of viewpoints lead to richer reasoning, resulting in a higher-quality output compared to outputs generated by existing single agent systems for the same task.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
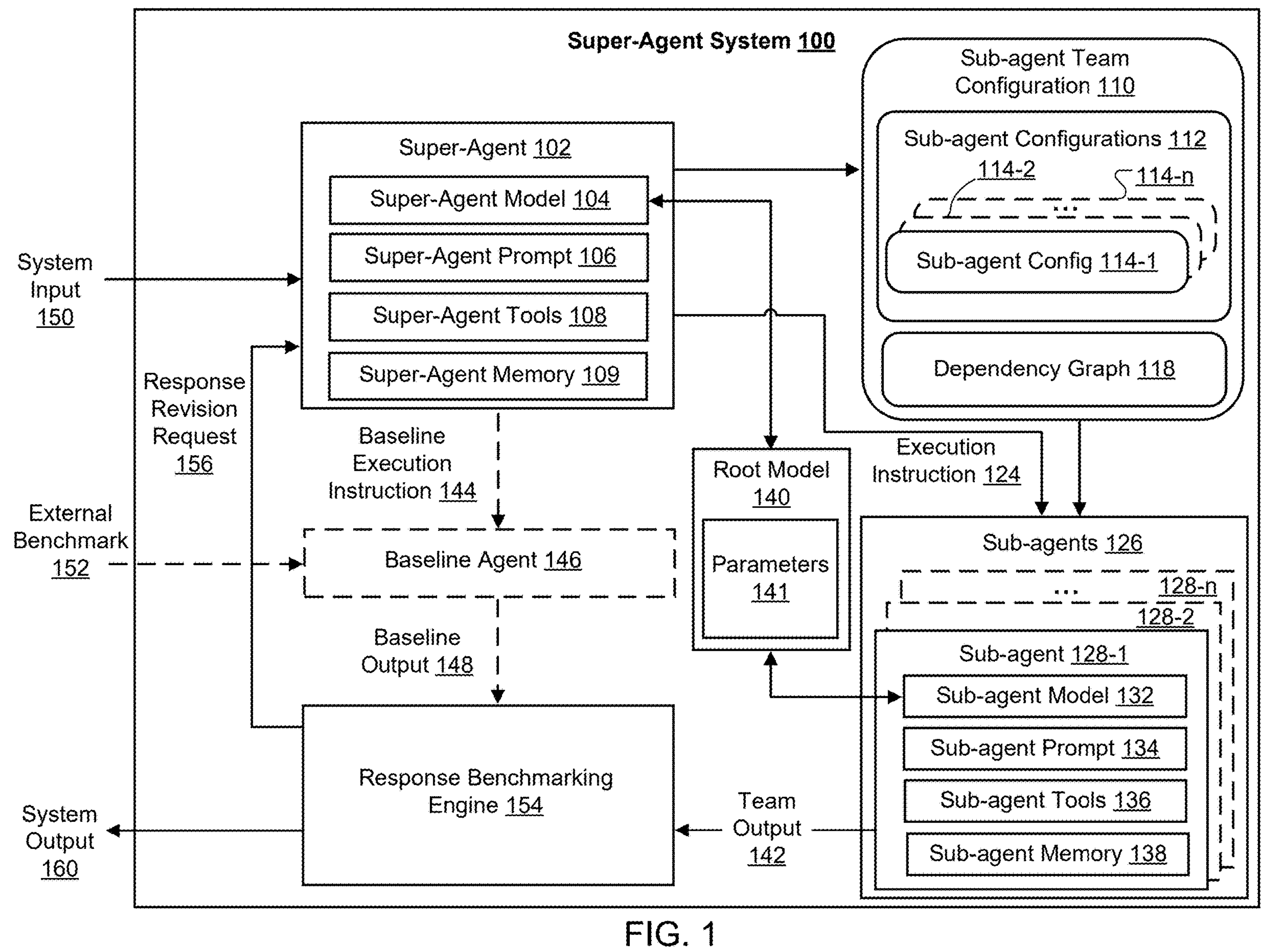
FIG. 1 illustrates an example architecture of a super-agent system.

FIG. 1 illustrates an example architecture of a super-agent system. The super-agent system 100 is an example of a system implemented as computer programs on one or more computers in one or more locations, in which the systems, components, and techniques described below can be implemented.

The super-agent system 100 can perform a variety of generative tasks.

In particular, the super-agent system 100 is configured to process a system input 150 and to generate a system output 160 for the system input 150. The system input 150 includes a task description that describes a task. In some implementations, the system input 150 further includes a task context that includes: a team setup request to load or modify a sub-agent team configuration, an initial instruction to execute the task, and historical information of one or more previous system inputs, previous system outputs, and executions performed by the super-agent and a plurality of previous sub-agents from one or more previous iterations.

The system input 150 can be provided by an end user, an automated process, or another computational system. The task can be one of a plurality of generative tasks including a natural language understanding task, a reasoning task, a coding task, a software engineering task, a web-browsing task, a reinforcement learning task, a robotic control task, a planning and decision-making task, a research task, a dialogue and multi-turn interaction task, a tool-use task, a safety evaluation task, a multi-modal reasoning task, a career planning task, a financial planning task, a real estate planning task, a shopping planning task, an education planning task, an entertainment recommendation task, a travel planning task, and a business task. Examples of generative tasks that the super-agent system 100 can perform are described in more detail below.

Generally, the super-agent system 100 includes a super-agent 102, a root model 140, and a plurality of sub-agents 126, and a response benchmarking engine 154. Each of the super-agent 102 and the plurality of sub-agents 126 can include one or more computer software programs. The super-agent 102 includes a super-agent model 104, a super-agent prompt 106, super-agent tools 108, and a super-agent memory 109. In some implementations, the super-agent system 100 includes a baseline agent 146.

The response benchmarking engine 154 is a software-based system, subsystem, or process that is programmed to perform one or more specific functions as described below. The response benchmarking engine 154 will be implemented as one or more software modules or components, installed on one or more computers in one or more locations. In some implementations, the response benchmarking engine 154 is a machine learning model (for example, a generative neural network).

In particular, a machine learning model is a parameterized computational system trained on data to approximate a target function by optimizing an objective function, thereby enabling automated inference or prediction on previously unseen inputs. A generative neural network is a machine learning model implemented as a neural architecture that learns a probabilistic representation of a data distribution and generates novel samples by drawing from that learned representation.

The super-agent model 104 is a machine learning model configured to process an input to generate a sub-agent team configuration 110. The input can be the system input 150 or a response revision request 156 which will be described in detail below.

The super-agent prompt 106 defines instructions and contextual information that control the super-agent's role, objectives, reasoning behavior, and output characteristics during task execution.

The super-agent tools 108 are the configured set of external software functions, APIs, or physical resources, defined with their interfaces and usage instructions, that the super-agent may invoke to perform tasks.

The super-agent 109 is configured to store execution data of the super-agent 102.

The root model 140 includes a plurality of parameters 141. In some implementations, the root model 140 can be a machine learning model. For example, in some implementations, the root model 140 can be a generative neural network. For instance, the root model 140 can be a large language model (LLM), a large vision model (LVM), a large vision-language model (LVLM), a multi-modal language model (MLLM), a multi-modal neural network model, or a combination thereof. In some implementations, the root model 140 can be a world model, a predictive machine learning model, a task-driven machine learning model, a control-based machine learning model, a game theory-based machine learning model, a neuro-symbolic machine learning model, a graph-based machine learning model, a quantum-based machine learning model, a biology-based machine learning model, a Deoxyribonucleic Acid (DNA)-based machine learning model with molecular computation, a reinforcement learning model, or a combination thereof.

A large language model (LLM) is a machine learning model, typically implemented as a high-parameter neural network, trained on large-scale textual data to learn statistical relationships among tokens and to generate, transform, or evaluate natural language through probabilistic inference.

A large vision model (LVM) is a machine learning model, typically a high-capacity neural network, trained on large-scale visual data to learn hierarchical representations for image or video understanding tasks such as recognition, detection, or generation.

A large vision-language model is a machine learning model that jointly learns aligned representations of visual and textual data to enable cross-modal inference, such as image captioning, visual question answering, or vision-guided language generation.

A multi-modal language model (MLLM) is a machine learning model centered on a language modeling objective that integrates and reasons over representations from multiple input modalities, including text, vision, audio, or structured data, to produce coherent language-based outputs.

In some implementations, the super-agent model 104 of the super-agent 102 is a replica of the root model 140. In particular, the architecture of the super-agent model 104 is a copy of the architecture of the root model 140, and the values of parameters of the super-agent model 104 are copies of the values of parameters of the root model 140.

In some other implementations, instead of replicating the architecture of root model 140, the super-agent model 104 can interact with the root model 140 to perform a task. During execution of the task, the super-agent model 104 can send the super-agent prompt 106 and other inputs to the root model 140 and receive outputs from the root model 140.

The super-agent system 100 is configured to receive the system input 150. The super-agent system 100 is configured process, using the super-agent 102, the system input 150 to obtain a current sub-agent team configuration 110 for performing the task. The sub-agent team configuration 110 includes a plurality of sub-agent configurations 112 and a dependency graph 118. The current sub-agent team configuration 110 specifies a number of sub-agent configurations (e.g., 3, 5, 10, 23, 54, or 101 configurations) corresponding to the number of sub-agents (e.g., 3, 5, 10, 23, 54, or 101 sub-agents) needed to perform the task. Each sub-agent configuration (e.g. 114-1, 114-2, . . . , 114*n*) in the plurality of sub-agent configurations 112 includes a sub-agent model description, a sub-agent prompt, and a sub-agent tools description. In particular, each sub-agent model description specifies the identity, architecture, and core functional characteristics of the underlying machine learning model (e.g., a generative model such as a generative neural network) used by the sub-agent to process inputs and generate outputs.

Each sub-agent prompt defines the structured instructions and contextual information that control the respective sub-agent's role, objectives, reasoning behavior, and output characteristics during task execution.

Each sub-agent tools description includes a structured manifest detailing the external software functions, APIs, or physical resources available to the sub-agent, including their input parameters, expected output formats, and specific instructions for their utilization during task execution.

Based on the sub-agent team configuration 110, the super-agent system 100 obtains a plurality of sub-agents 126.

In some implementations, the super-agent system 100 obtains the plurality of sub-agents 126 by initializing the plurality of sub-agents 126. In particular, for each sub-agent configuration in the plurality of sub-agent configurations 110, the super-agent system 100 initializes a respective sub-agent configured based on the sub-agent configuration. For example, sub-agents 128-1, 128-2, . . . , 128-*n* in the plurality of sub-agents 126 are initialized based on the sub-agent configurations 114-1, 114-2, . . . , 114-*n*, respectively, with n≥2. Each sub-agent in the plurality of sub-agents includes (i) a sub-agent model specified by the sub-agent model description in the respective sub-agent configuration, (ii) the sub-agent prompt included in the respective sub-agent configuration, (iii) sub-agent tools specified by the sub-agent tools description in the respective sub-agent configuration, and (iv) a sub-agent memory configured to store execution data of the sub-agent.

The super-agent system 100 initializes each sub-agent in the plurality of sub-agents 126 by instantiating a software object or process from the software program associated with the sub-agent using the sub-agent model, sub-agent prompt, sub-agent tools, the task context. That means, to initialize each sub-agent, the super-agent system 100 loads the sub-agent model, sub-agent prompt, sub-agent tools, and the task context into runtime so that the sub-agent can begin autonomous or semi-autonomous operations. In addition, for each sub-agent in the plurality of sub-agents 126, the super-agent system 100 initializes a temporary output, which is initially empty. The temporary output is the sub-agent's own response to the task and is stored in the sub-agent memory. Each sub-agent is configured to repeatedly update its temporary output during the execution of the task. The process by which the temporary outputs of the plurality of sub-agents are updated is described in further detail below with reference to FIG. 4.

For example, as shown in FIG. 1, the sub-agent 128-1 includes a sub-agent model 132, a sub-agent prompt 134, sub-agent tools 136, and a sub-agent memory 138. Since each sub-agent model description includes the description of the root model 140, each sub-agent in the plurality of sub-agents 126 initially has a respective replica of the root model 140. In particular, each sub-agent model shares the same model architecture of the root model 140 and the values of parameters of the sub-agent model are copies of the values of parameters of the root model 140. For example, the sub-agent model 132 of the sub-agent 128-1 shares the same model architecture of the root model 140, and the values of parameters of the sub-agent model 132 are copies of the values of parameters of the root model 140.

In some implementations, the sub-agent model of each sub-agent of the plurality of sub-agents 126 is a replica of the root model 140. In particular, the architecture of each sub-agent model is a copy of the architecture of the root model 140, and the values of parameters of each sub-agent model are copies of the values of parameters of the root model 140. For example, the sub-agent model 132 of the sub-agent 128-1 is a copy of the architecture of the root model 140, and the values of parameters of the sub-agent model 132 are copies of the values of parameters of the root model 140.

In some implementations, instead of replicating the architecture of root model 140, each sub-agent model can interact with the root model 140 to perform the sub-agent's role as defined by the respective sub-agent prompt. For example, during execution of the task, the sub-agent model 132 can send the sub-agent prompt 134 and other inputs to the root model 140 and receive outputs from the root model 140.

In some implementations, in response to the response revision request 156, the super-agent 102 can update the sub-agent team configuration 110 to improve performance of the super-agent system 100 in subsequent executions of the task. In these implementations, each sub-agent model description in each sub-agent configuration in the updated plurality of sub-agent configurations 110 can include a description of a new model that is specified by the super-agent 102 to replace the root model 140. Therefore, as directed by the super-agent 102, each sub-agent in the plurality of sub-agents 126 can include the respective sub-agent model that is the new model in subsequent executions of the task. The process of replacing the root model 140 with the new model in the plurality of sub-agents is described in more detail below.

The dependency graph 118 represents an order of executions performed by the plurality of sub-agents 126 to execute the task. In particular, the dependency graph 118 includes a plurality of nodes and a plurality of edges. Each node in the plurality of nodes represents a sub-agent in the plurality of sub-agents 126. Each edge in the plurality of edges connects two nodes in the plurality of nodes and specifies a communication protocol between two sub-agents represented by the two nodes.

The dependency graph 118 specifies, for each sub-agent represented by a corresponding node, at least one of (i) one or more parent nodes representing one or more preceding sub-agents that are configured to complete their executions before the sub-agent begins its executions, or (ii) one or more child nodes representing one or more succeeding sub-agents that are configured to receive outputs of the sub-agent as inputs. Thus, the dependency graph 118 here represents working relationship in the team of sub-agents.

In some implementations, the dependency graph 118 is a directed acyclic graph (DAG). In some other implementations, the dependency graph 118 is a tree.

In some implementations, the dependency graph 118 includes a plurality of super-nodes and a plurality of super-edges. Each super-node in the plurality of super-nodes includes one or more nodes in the plurality of nodes and represents an organization of one or more sub-agents represented by the one or more nodes. Each super-edge in the plurality of super-edge connects two super-nodes in the plurality of super-nodes and specifies a communication protocol between two organizations represented by the two super-nodes. Thus, the dependency graph 118 can map the structure of sub-agents to the organizational structure of an entity. For example, the entity can be a corporation, a nonprofit, a government, an agency, an institution, a hospital, a partnership, a cooperative, a foundation, an association, a firm, a startup, a franchise, a union, a consortium, a syndicate, a trust, a committee, a board, or an enterprise. The super-nodes in the dependency graph 118 can represent a group of people in the entity. For example, if the entity is a corporation, each super-node in the super-nodes can be a finance, marketing, or engineering department, or a business unit in the corporation.

In some implementations, the super-agent system 100 obtains the plurality of sub-agents 126 from previous task execution. More particularly, when the system input 150 includes a task context that includes a team setup request to request the super-agent system 100 to load or modify a sub-agent team configuration, the super-agent system 100 does not need to initialize the sub-agents 126 from scratch. Instead, if the team setup request is a request to load a sub-agent team configuration, the super-agent system 100 can load a sub-agent team configuration that was generated during execution of a related previous task and continue using the loaded sub-agent team configuration for executing the current task. If the team setup request is a request to modify a sub-agent team configuration, the super-agent system 100 can (i) modify a sub-agent team configuration generated during execution of a related previous task for executing the current task indicated by the system input and (ii) modify one or more sub-agents of the previously initialized sub-agents according to the modified sub-agent team configuration. As a result, the super-agent system 100 can reduce the amount of computational resources that would otherwise be required by existing systems to set up the team of sub-agents from scratch for executing the task.

After the sub-agents 126 are obtained, the super-agent system 100 provides an execution instruction 124 from the super-agent 102 to the plurality of sub-agents 126. The execution instruction 124 includes a signal that allows each of the plurality of sub-agents 126 to start its operations based on its sub-agent prompt. The super-agent system 100 uses the plurality of sub-agents to generate, based on the dependency graph 118 and the execution instruction 124, a team output 142 that represents a response to the task. The generation of the team output 142 by the sub-agents 126 is described in further detail below with reference to FIG. 4. Subsequently, the super-agent system 100 updates, using the response benchmarking engine 154 and based on the team output 142, at least one value of at least one metric for the team output 142.

The response benchmarking engine 154 is configured to determine whether the at least value of the at least one metric for the team output 142 meets at least one threshold value. If the at least value of the at least one metric for the team output 142 does not meet at least one threshold value, the response benchmarking engine 154 response generates a response revision request 156 to the super-agent 102. The response revision request 156 may include: an explanation of deficiencies of the team output 142 as measured by the at least one value of at least one metric, and an instruction that directs regeneration or modification of the team output 142 to satisfy the at least one threshold value.

In response to the response revision request 156, the super-agent system 100 repeats the above steps (i.e., providing, by the super-agent 102, a new execution instruction that further includes the response revision request 156, to the plurality of sub-agents 126; using the sub-agents 126 to generate a new team output based on the new execution instruction; and updating, using the response benchmarking engine 154 and based on the new team output, at least one value of at least one metric for the new team output). If the at least one value of the at least one metric for the team output 142 meets the at least one threshold value, the super-agent system 100 returns the team output 142 as the system output 160.

Additionally, in response to the response revision request 156, the super-agent 102 can update the sub-agent team configuration 110 to improve performance of the super-agent system 100 in subsequent executions of the task. Updating the sub-agent team configuration 110 including updating at least one of the number of sub-agents needed to perform that task (i.e. removing a sub-agent or adding a new sub-agent), the plurality of sub-agent configurations 112, and the dependency graph 118. In particular, updating a sub-agent configuration in the plurality of sub-agent configurations 112 includes updating at least one of the respective sub-agent model description, the respective sub-agent prompt, or the respective sub-agent tools description. Updating the respective sub-agent model description can include using a description of a new model that is specified by the super-agent 102 to replace the root model 140. As a result, as directed by the super-agent 102, the plurality of sub-agents 126 is updated according to the updated sub-agent team configuration 110. Each sub-agent in the updated plurality of sub-agents 126 can include the respective sub-agent model that is the new model replacing the root model 140 in subsequent executions of the task. This revision process can also automatically and incrementally provide improved prompts to the plurality of sub-agents 126 during the execution of the task without going through a training phase, reset and reconfiguration of the sub-agents, or re-running the task from scratch.

The at least one metric may include one or more metrics from a plurality of metrics. The plurality of metrics may include quality of the team output 142, a computational cost of generating the team output 142, and a privacy level of the team output 142. The privacy level represents a degree of adherence to policies governing protection of sensitive or personally identifiable information.

For example, in some implementations, the at least one metric includes the quality of the team output 142, and the at least one threshold value represents the acceptable quality that the team output 142 should have. For example, the quality metric may include an accuracy score, confidence score, relevance score, or coherence score associated with the team output, and the threshold value may specify a minimum acceptable score, such as a minimum accuracy percentage, a minimum relevance or similarity value, below which the team output 142 is rejected and the response benchmarking engine 154 sends a response revision request to the super-agent 102. When the at least one threshold value that represents the acceptable quality is reached, the super-agent system 100 returns the team output 142 as the system output 160.

In some implementations, the at least one metric includes a computational cost of generating the team output 142, and the at least one threshold value represents the maximum computational cost that the super-agent system 100 can spend to generate the team output 142. For example, the cost metric may include inference latency, processor utilization, memory consumption, number of executed model steps, number of generated tokens, energy usage, or monetary cost associated with compute resources, and the threshold value may define a maximum allowable latency, resource usage limit, token budget, or cost budget, that must not be exceeded. When the at least one threshold value that represents the maximum computational cost is reached, the super-agent system 100 returns the team output 142 as the system output 160.

In some implementations, the at least one metric includes a privacy level of team output 142, and the at least one threshold value represents a minimum level of compliance with data-handling and sensitive or personally identifiable information protection policies that the team output 142 should have. When a value of the privacy level of the team output 142 is below the minimum level of compliance, the team output 142 is rejected and the response benchmarking engine 154 sends a response revision request to the super-agent 102. When a value of the privacy level of the team output 142 meets or exceeds the minimum level of compliance, the super-agent system 100 returns the team output 142 as the system output 160.

In some implementations, to further improve the performance of the super-agent system on the task, the super-agent system 100 includes the baseline agent 146. The baseline agent 146 is a machine learning model. The baseline agent 146 may have a pre-defined prompt. For example, the baseline agent 146 can be a previous version of the super-agent or a third-party agent including a generative neural network. Generally, the baseline agent 146 is configured to process a system input based on its prompt to generate a baseline output that represents a response to a task indicated by the system input. The baseline output is an output that meets or exceeds a quality threshold. In particular, in addition to sending the execution instruction 124 to the plurality of sub-agents 126, the super-agent 102 is configured to process the system input 150 to generate a baseline execution instruction 144. The baseline execution instruction 144 includes (i) the system input 150 and (ii) a signal that allows the baseline agent 146 to start its operations based on its prompt. In response to the baseline execution instruction 144, the baseline agent 146 processes the system input 150 to generate a baseline output 148. In some implementations, the baseline agent 146 can have access to an external benchmark 152 such as a ground-truth output to generate the baseline output 148. In these implementations, the response benchmarking engine 154 is configured to compare the team output 142 generated by the plurality of sub-agents 126 and the baseline output 148 generated by the baseline agent 146 for the same system input to determine if a response revision request is needed.

In the implementations where the baseline agent 146 is used, the at least one metric for evaluating the team output 142 includes a benchmarking metric that represents a difference in quality between the team output 142 and the baseline output 148. The quality of each output is measured by an accuracy score, confidence score, relevance score, coherence score, or compliance score. The response benchmarking engine 154 computes the benchmarking metric based on the team output 142 and the baseline output 148. The response benchmarking engine 154 uses the benchmarking metric to update the at least one value of the at least one metric. The threshold value may define the minimum acceptable quality of the team output 142 compared to the baseline output 148, below which the team output 142 is rejected and the response benchmarking engine 154 sends a response revision request to the super-agent 102. When the at least one threshold value that represents the minimum acceptable quality is reached, the super-agent system 100 returns the team output 142 as the system output 160. The response revision request may include: an explanation of deficiencies of the team output 142 as measured by the benchmarking metric, and an instruction that directs regeneration or modification of the team output 142 to satisfy the at least one threshold value.

Further examples of generative tasks that the super-agent system 100 can perform are described in detail below.

In some implementations, the task can be a natural language understanding task, including question answering, reading comprehension, summarization, translation, or instruction following. For example, the task may be a question answering task. If the input to the super-agent system 100 is a natural language question such as "What causes photosynthesis?", optionally together with a supporting text passage, the output generated by the super-agent system 100 may be a direct answer such as "Photosynthesis is caused by the absorption of light energy by chlorophyll."

As another example, the task can be a reading comprehension task. If the input to the super-agent system 100 is a document describing a sequence of events and an associated query such as "Why did the server fail?", the output generated by the super-agent system 100 may be an explanatory phrase extracted or inferred from the document, such as "because the memory limit was exceeded."

As another example, the task may be a summarization task. If the input to the super-agent system 100 is a multi-paragraph article, the output generated by the super-agent system 100 may be a shorter textual summary that captures key points of the article.

As another example, the task may be a translation task. If the input to the super-agent system 100 is text in a first language, such as Spanish text "El sistema está activo," the output generated by the super-agent system 100 may be a corresponding translation in a second language, such as English text "The system is active."

As another example, the task may be an instruction following task. If the input to the super-agent system 100 is an instruction such as "Generate a checklist for deploying a web application," the output generated by the super-agent system 100 may be a structured list of deployment steps.

In some implementations, the task can be a reasoning task, including mathematical, symbolic, or commonsense reasoning. For example, the task may be a mathematical reasoning task. If the input to super-agent system 100 is a mathematical problem expressed in natural language or symbolic form, such as "If a train travels at 60 miles per hour for 2 hours, how far does it travel?", the output generated by the super-agent system 100 may be a numerical result such as "120 miles," optionally accompanied by intermediate reasoning steps.

As another example, the task may be a symbolic reasoning task. If the input to the super-agent system 100 includes a set of symbols, rules, or logical expressions, such as "All A are B; all B are C; is A a subset of C?", the output generated by the super-agent system 100 may be a logical conclusion such as "Yes, A is a subset of C," derived by applying the provided rules. As another example, the task may be a commonsense reasoning task. If the input to the super-agent system 100 is a scenario described in natural language, such as "A glass is dropped onto a concrete floor," the output generated by the super-agent system 100 may be an inferred outcome such as "the glass is likely to break," based on learned real-world knowledge.

In some implementations, the task can be a coding task, including code generation, code completion, code refactoring, debugging, or translating code between programming languages. For example, the task may be a code generation task. If the input to the super-agent system 100 is a natural language description such as "Write a function that sorts a list of integers," the output generated by the super-agent system 100 may be source code implementing a sorting function in a specified programming language.

As another example, the task may be a code completion task. If the input to the super-agent system 100 is a partially written code snippet with missing statements or parameters, the output generated by the super-agent system 100 may be one or more code lines that complete the snippet in a syntactically and semantically correct manner.

As another example, the task may be a code refactoring task. If the input to the super-agent system 100 is existing source code, the output generated by the super-agent system 100 may be a modified version of the code that preserves functionality while improving readability, efficiency, or adherence to coding standards.

As another example, the task may be a debugging task. If the input to the super-agent system 100 is source code associated with an error message or failing test case, the output generated by the super-agent system 100 may be a corrected version of the code or an identification of the cause of the error.

As another example, the task may be a code translation task. If the input to the super-agent system 100 is source code written in a first programming language, such as Python, the output generated by the super-agent system 100 may be corresponding source code written in a second programming language, such as Java, while preserving program logic and functionality.

In some implementations, the task can be a software engineering task, including requirements analysis, architectural design, implementation planning, test-case generation, code review, or system-level optimization. For example, the task may be a requirements analysis task. If the input to the super-agent system 100 is a natural language description of stakeholder needs or business objectives, the output generated by the super-agent system 100 may be a structured set of functional and non-functional requirements suitable for use in a software specification.

As another example, the task may be an architectural design task. If the input to the super-agent system 100 describes system constraints, performance goals, and component interactions, the output generated by the super-agent system 100 may be a proposed software architecture identifying system components, interfaces, and data flows.

As another example, the task may be an implementation planning task. If the input to the super-agent system 100 includes a set of requirements and available resources, the output generated by the super-agent system 100 may be an implementation plan defining development phases, task dependencies, and estimated timelines.

As another example, the task may be a test-case generation task. If the input to the super-agent system 100 is source code or a functional specification, the output generated by the super-agent system 100 may be a set of test cases designed to validate expected behavior and edge conditions.

As another example, the task may be a code review task. If the input to the super-agent system 100 is a codebase or code change set, the output generated by the super-agent system 100 may include identified issues, suggested improvements, or compliance assessments relative to coding standards.

As another example, the task may be a system-level optimization task. If the input to the super-agent system 100 includes system performance metrics or operational logs, the output generated by the super-agent system 100 may be recommendations for optimizing resource utilization, latency, or scalability.

In some implementations, the task can be a web-browsing task, including retrieving information from online sources, navigating webpages, extracting structured data, monitoring content updates, or interacting with web-based interfaces to complete user-specified objectives. For example, the task may be an information retrieval task. If the input to the super-agent system 100 is a user query requesting specific information, the output generated by the super-agent system 100 may include browser actions such as submitting a search query, opening one or more result webpages, and extracting the requested information from the displayed content.

As another example, the task may be a webpage navigation task. If the input to the super-agent system 100 specifies a user objective, the output generated by the super-agent system 100 may include browser actions such as clicking hyperlinks, scrolling through pages, selecting menu items, and navigating between webpages to reach a target page.

As another example, the task may be a data extraction task. If the input to the super-agent system 100 is a webpage URL containing unstructured or semi-structured content, the output generated by the super-agent system 100 may include browser actions such as identifying relevant page elements, parsing displayed text or tables, and extracting structured data fields from the webpage.

As another example, the task may be a content monitoring task. If the input to the super-agent system 100 identifies a webpage URL and a monitoring condition, the output generated by the super-agent system 100 may include browser actions such as periodically reloading the webpage, comparing current content with previously observed content, and detecting updates or changes that satisfy the condition.

As another example, the task may be an interactive transaction task. If the input to the super-agent system 100 is a user-specified objective such as "Book a table at a restaurant," the output generated by the super-agent system 100 may include form inputs, confirmations, or transaction results generated through interaction with a web-based interface.

In some implementations, the task can be a reinforcement learning task, including learning policies through interaction with an environment, evaluating rewards, and optimizing action selection over time to maximize cumulative return. For example, the task may be a policy learning task. If the input to the super-agent system 100 includes observations of environment states and associated reward signals, the output generated by the super-agent system 100 may be an updated policy or policy parameters that map states to actions so as to improve expected long-term reward.

As another example, the task may be a value function estimation task. If the input to the super-agent system 100 includes state-action trajectories and observed rewards, the output generated by the super-agent system 100 may be estimated value functions or action-value functions representing expected cumulative rewards under a given policy.

As another example, the task may be an exploration-exploitation management task. If the input to the super-agent system 100 includes uncertainty measures, performance history, or exploration constraints, the output generated by the super-agent system 100 may be action-selection strategies that balance exploring new behaviors with exploiting known high-reward actions.

As another example, the task may be a reward modeling task. If the input to the super-agent system 100 includes feedback signals, preference data, or outcome evaluations, the output generated by the super-agent system 100 may be a learned reward function or reward model used to guide policy optimization.

As another example, the task may be a policy evaluation and improvement task. If the input to the super-agent system 100 includes performance metrics or simulated rollouts under a current policy, the output generated by the super-agent system 100 may be policy updates, convergence indicators, or performance assessments used to iteratively refine agent behavior.

In some implementations, the task can be a robotic control task, including motion planning, manipulation, navigation, sensor interpretation, or executing coordinated actions in accordance with user-defined goals. For example, the task may be a motion planning task. If the input to the super-agent system 100 includes a target position and environmental constraints, the output generated by the super-agent system 100 may be a sequence of control commands defining joint trajectories or movement paths for a robot to reach the target position while avoiding obstacles.

As another example, the task may be a manipulation task. If the input to the super-agent system 100 includes sensor data describing an object and a goal such as grasping the object, the output generated by the super-agent system 100 may be control signals for actuators that cause a robotic arm or gripper to grasp, lift, or place the object.

As another example, the task may be a navigation task. If the input to the super-agent system 100 includes a map, localization data, and a destination, the output generated by the super-agent system 100 may be navigation commands that direct a mobile robot to move through an environment while avoiding obstacles and following a planned route.

As another example, the task may be a sensor interpretation task. If the input to the super-agent system 100 includes data from sensors such as cameras, lidar, or force sensors, the output generated by the super-agent system 100 may be interpreted state information, such as object positions, terrain characteristics, or contact conditions, used to guide robotic actions.

As another example, the task may be a coordinated action execution task. If the input to the super-agent system 100 specifies a user-defined goal involving multiple steps, the output generated by the super-agent system 100 may be a sequence of coordinated control actions executed across multiple robotic components to achieve the specified goal.

In some implementations, the task can be a planning and decision-making task, including goal decomposition, strategy formulation, resource allocation, scheduling, or selecting actions based on predicted outcomes. For example, the task may be a goal decomposition task. If the input to the super-agent system 100 is a high-level objective, the output generated by the super-agent system 100 may be a set of sub-goals or intermediate steps that, when executed in sequence or in parallel, achieve the high-level objective.

As another example, the task may be a strategy formulation task. If the input to the super-agent system 100 includes a description of an environment, constraints, and desired outcomes, the output generated by the super-agent system 100 may be a strategy specifying a sequence or policy of actions optimized to achieve the desired outcomes.

As another example, the task may be a resource allocation task. If the input to the super-agent system 100 includes available resources and competing demands, the output generated by the super-agent system 100 may be an allocation plan assigning resources to tasks or agents in a manner that satisfies constraints or optimizes performance metrics.

As another example, the task may be a scheduling task. If the input to the super-agent system 100 includes tasks, dependencies, and time constraints, the output generated by the super-agent system 100 may be a schedule specifying execution order and timing for the tasks.

As another example, the task may be an action selection task. If the input to the super-agent system 100 includes predicted outcomes associated with candidate actions, the output generated by the super-agent system 100 may be a selected action or ranked set of actions chosen based on an optimization criterion or decision policy.

In some implementations, the task can be a research task, including literature review, hypothesis generation, experimental design, data analysis, synthesis of findings across multiple sources, or domain-specific investigations such as scientific, medical, financial, legal, or engineering research. For example, the task may be a literature review task. If the input to the super-agent system 100 includes a research topic or query, the output generated by the super-agent system 100 may be a summary of relevant prior work identified across multiple publications, including key findings, methodologies, and trends.

As another example, the task may be a hypothesis generation task. If the input to the super-agent system 100 includes observed data patterns or prior research results, the output generated by the super-agent system 100 may be one or more testable hypotheses that explain the observed phenomena.

As another example, the task may be an experimental design task. If the input to the super-agent system 100 specifies a research objective and constraints, the output generated by the super-agent system 100 may be a proposed experimental protocol defining variables, controls, and measurement procedures.

As another example, the task may be a data analysis task. If the input to the super-agent system 100 includes experimental, observational, or transactional data, the output generated by the super-agent system 100 may be analytical results such as statistical summaries, identified correlations, or predictive models.

As another example, the task may be a synthesis task. If the input to the super-agent system 100 includes findings from multiple sources, the output generated by the super-agent system 100 may be an integrated interpretation that reconciles similarities, differences, or inconsistencies across the sources.

As another example, the task may be a scientific research task. If the input to the super-agent system 100 includes experimental results and prior studies in a scientific domain such as physics or chemistry, the output generated by the super-agent system 100 may be an interpretation or theoretical explanation of observed phenomena.

As another example, the task may be a medical research task. If the input to the super-agent system 100 includes clinical trial data and medical literature, the output generated by the super-agent system 100 may be an assessment of treatment efficacy or identification of potential risk factors.

As another example, the task may be a financial research task. If the input to the super-agent system 100 includes financial statements, market data, and economic indicators, the output generated by the super-agent system 100 may be an analysis identifying trends, risks, or investment opportunities.

As another example, the task may be a legal research task. If the input to the super-agent system 100 includes a legal question, factual scenario, jurisdictional constraints, or references to statutes, regulations, or case law, the output generated by the super-agent system 100 may be identified and analyzed legal authorities, summaries of relevant precedent, issue-spotting analyses, or synthesized research results that support legal reasoning, drafting, or decision-making.

As another example, the task may be an engineering research task. If the input to the super-agent system 100 includes design parameters, simulation results, and performance data, the output generated by the super-agent system 100 may be conclusions regarding system behavior, design trade-offs, or recommended improvements.

In some implementations, the task can be a dialogue and multi-turn interaction task, including context tracking, intent interpretation, response generation, turn management, or maintaining coherence across extended conversational exchanges. For example, the task may be a context tracking task. If the input to the super-agent system 100 includes a sequence of prior dialogue turns, user references, or conversational state variables, the output generated by the super-agent system 100 may include an updated dialogue state, resolved references, or stored contextual representations that reflect relevant information carried forward across turns.

As another example, the task may be an intent interpretation task. If the input to the super-agent system 100 includes a user utterance or dialogue turn, optionally combined with prior conversational context, the output generated by the super-agent system 100 may be a classified intent, inferred user goal, or structured semantic representation used to guide subsequent system behavior.

As another example, the task may be a response generation task. If the input to the super-agent system 100 includes an interpreted intent, contextual state, and optionally external knowledge or constraints, the output generated by the super-agent system 100 may be a natural-language response, structured reply, or multimodal output formulated to address the user's request or advance the dialogue.

As another example, the task may be a turn management task. If the input to the super-agent system 100 includes dialogue timing information, speaker identifiers, or conversational cues, the output generated by the super-agent system 100 may be a determination of when to respond, whether to request clarification, or how to allocate control of the conversation between participants.

As another example, the task may be a coherence maintenance task. If the input to the super-agent system 100 includes multiple dialogue turns spanning an extended interaction, the output generated by the super-agent system 100 may be responses or internal representations that preserve topical consistency, logical continuity, and alignment with previously established conversational commitments across the exchange.

In some implementations, the task can be a tool-use task, including invoking external software or APIs, executing commands through integrated tools, manipulating digital resources, or coordinating multiple tools to accomplish complex objectives. For example, the task may be an API invocation task. If the input to the super-agent system 100 includes a structured request specifying an external service, endpoint parameters, or authentication credentials, the output generated by the super-agent system 100 may be an API call, a formatted request payload, or retrieved data returned from the external service.

As another example, the task may be a command execution task. If the input to the super-agent system 100 includes an instruction to perform an operation using an integrated software tool or execution environment, the output generated by the super-agent system 100 may be executed commands, operation results, or status indicators reflecting successful or failed execution.

As another example, the task may be a digital resource manipulation task. If the input to the super-agent system 100 includes identifiers or representations of digital resources such as files, databases, or memory objects, the output generated by the super-agent system 100 may be modified resources, updated records, or transformed data produced in accordance with the specified operation.

As another example, the task may be a multi-tool coordination task. If the input to the super-agent system 100 includes a complex objective decomposable into multiple sub-tasks, each associated with different tools or services, the output generated by the super-agent system 100 may be a sequence of tool invocations, intermediate results, or an integrated outcome produced by coordinating the tools according to a defined workflow or control policy.

As another example, the task may be an error handling and recovery task. If the input to the super-agent system 100 includes execution failures, exception signals, or unexpected tool responses, the output generated by the super-agent system 100 may include corrective actions, alternative tool selections, retries, or diagnostic information used to restore or continue task execution.

In some implementations, the task can be a safety evaluation task, including risk assessment, content safety classification, robustness analysis, detection of harmful or non-compliant outputs, or verification of adherence to predefined safety constraints. For example, the task may be a risk assessment task. If the input to the super-agent system 100 includes a proposed action, generated output, or system configuration, the output generated by the super-agent system 100 may be an identified set of potential risks, a risk score, or a categorization of safety impact based on predefined risk models or evaluation criteria.

As another example, the task may be a content safety classification task. If the input to the super-agent system 100 includes generated text, images, code, or other content artifacts, the output generated by the super-agent system 100 may be a classification label, confidence score, or policy category indicating whether the content complies with applicable safety, legal, or ethical guidelines.

As another example, the task may be a robustness analysis task. If the input to the super-agent system 100 includes adversarial inputs, edge cases, or stress-test scenarios, the output generated by the super-agent system 100 may be performance metrics, failure characterizations, or indicators of system stability under non-ideal or adversarial operating conditions.

As another example, the task may be a harmful or noncompliant output detection task. If the input to the super-agent system 100 includes candidate outputs produced by a generative or decision-making model, the output generated by the super-agent system 100 may be a determination that one or more outputs violate safety constraints, along with flags, annotations, or filtered alternatives.

As another example, the task may be a safety constraint verification task. If the input to the super-agent system 100 includes predefined safety rules, policy requirements, or operational boundaries in combination with system outputs or internal states, the output generated by the super-agent system 100 may be a verification result indicating compliance or noncompliance, optionally accompanied by explanations or enforcement actions.

In some implementations, the task can be a multi-modal reasoning task, including integrating and interpreting information across text, images, audio, video, or structured data to generate coherent analyses, inferences, or coordinated outputs. For example, the task may be a cross-modal integration task. If the input to the super-agent system 100 includes information from multiple modalities, such as textual descriptions combined with images or structured data, the output generated by the super-agent system 100 may be a unified internal representation or synthesized interpretation that aligns and reconciles the disparate modalities.

As another example, the task may be a visual-language reasoning task. If the input to the super-agent system 100 includes one or more images together with associated text prompts or questions, the output generated by the super-agent system 100 may be a natural-language explanation, classification, or inference that is grounded in visual features extracted from the images.

As another example, the task may be an audio-text interpretation task. If the input to the super-agent system 100 includes audio signals, speech transcripts, or acoustic features in combination with textual context, the output generated by the super-agent system 100 may be a semantic interpretation, intent inference, or contextual response derived from jointly analyzing the audio and text inputs.

As another example, the task may be a video understanding task. If the input to the super-agent system 100 includes video data including temporal sequences of frames, optionally paired with captions or metadata, the output generated by the super-agent system 100 may be event detections, temporal summaries, or inferred activities that account for both spatial and temporal information.

As another example, the task may be a structured data fusion task. If the input to the super-agent system 100 includes structured datasets, such as tables, graphs, or sensor readings, in combination with unstructured modalities, the output generated by the super-agent system 100 may be analytical conclusions, predictions, or coordinated outputs produced by reasoning over the combined data sources.

In some implementations, the task can be a career planning task, including skill assessment, role matching, pathway recommendation, resume or portfolio development, and analysis of labor-market opportunities aligned with user goals. For example, the task may be a skill assessment task. If the input to the super-agent system 100 includes a user's work history, education, certifications, or self-reported competencies, the output generated by the super-agent system 100 may be a structured inventory of skills, proficiency levels, or identified gaps relative to target roles or industries.

As another example, the task may be a role matching task. If the input to the super-agent system 100 includes a defined skill profile and career preferences, the output generated by the super-agent system 100 may be a ranked set of job roles, occupational categories, or position descriptions that align with the user's qualifications and stated objectives.

As another example, the task may be a career pathway recommendation task. If the input to the super-agent system 100 includes a current role, target role, and relevant constraints such as time, cost, or geographic location, the output generated by the super-agent system 100 may be a recommended sequence of roles, training steps, or experiential milestones designed to bridge the gap between the current and desired positions.

As another example, the task may be a resume or portfolio development task. If the input to the super-agent system 100 includes raw career information, prior resumes, or work artifacts, the output generated by the super-agent system 100 may be a refined resume, portfolio structure, or tailored content emphasizing relevant achievements, skills, and experiences for a specified audience or role.

As another example, the task may be a labor-market analysis task. If the input to the super-agent system 100 includes target roles, industries, or geographic parameters, the output generated by the super-agent system 100 may be insights regarding demand trends, compensation ranges, required qualifications, or growth projections, used to inform career decision-making and planning.

In some implementations, the task can be a financial planning task, including budgeting, cash-flow analysis, investment allocation, risk profiling, goal forecasting, or optimization of long-term financial strategies. For example, the task may be a budgeting task. If the input to the super-agent system 100 includes income sources, expense categories, and spending constraints, the output generated by the super-agent system 100 may be a budget allocation, spending plan, or variance analysis indicating alignment with financial objectives.

As another example, the task may be a cash-flow analysis task. If the input to the super-agent system 100 includes historical or projected inflows and outflows over a defined period, the output generated by the super-agent system 100 may be a cash-flow forecast, liquidity assessment, or identification of potential shortfalls or surpluses.

As another example, the task may be an investment allocation task. If the input to the super-agent system 100 includes available capital, investment horizon, market assumptions, and regulatory or personal constraints, the output generated by the super-agent system 100 may be a recommended asset allocation, portfolio composition, or rebalancing strategy optimized for expected return and risk.

As another example, the task may be a risk profiling task. If the input to the super-agent system 100 includes user preferences, financial obligations, and tolerance indicators, the output generated by the super-agent system 100 may be a quantified risk profile or classification used to tailor investment and planning recommendations.

As another example, the task may be a goal forecasting and optimization task. If the input to the super-agent system 100 includes long-term financial goals, such as retirement, education funding, or asset acquisition, together with time horizons and assumptions, the output generated by the super-agent system 100 may be projected outcomes, probability-of-success estimates, or optimized strategies designed to achieve the stated goals within defined constraints.

In some implementations, the task can be a real estate planning task, including property search and evaluation, market trend analysis, investment feasibility assessment, portfolio optimization, or forecasting valuation and rental performance. For example, the task may be a property search and evaluation task. If the input to the super-agent system 100 includes location preferences, budget constraints, property characteristics, and intended use, the output generated by the super-agent system 100 may be a shortlist of properties, comparative evaluations, or suitability scores aligned with the specified criteria.

As another example, the task may be a market trend analysis task. If the input to the super-agent system 100 includes geographic parameters, historical pricing data, transaction volumes, or macroeconomic indicators, the output generated by the super-agent system 100 may be identified trends, growth projections, or risk indicators characterizing current and expected market conditions.

As another example, the task may be an investment feasibility assessment task. If the input to the super-agent system 100 includes acquisition costs, financing terms, operating expenses, and projected income, the output generated by the super-agent system 100 may be financial metrics such as cash-on-cash return, internal rate of return, or break-even analysis used to evaluate investment viability.

As another example, the task may be a real estate portfolio optimization task. If the input to the super-agent system 100 includes multiple properties, capital constraints, and risk preferences, the output generated by the super-agent system 100 may be recommendations for asset allocation, acquisition, divestment, or diversification designed to optimize portfolio performance.

As another example, the task may be a valuation and rental performance forecasting task. If the input to the super-agent system 100 includes property attributes, market comparables, and rental data, the output generated by the super-agent system 100 may be projected property values, rental income forecasts, or occupancy estimates over a defined planning horizon.

In some implementations, the task can be a shopping planning task, including product discovery, comparison, budget alignment, purchase timing, and optimization of purchasing decisions based on user preferences and constraints. For example, the task may be a product discovery task. If the input to the super-agent system 100 includes user needs, functional requirements, brand preferences, or use-case descriptions, the output generated by the system may be a curated set of products or categories that satisfy the specified criteria.

As another example, the task may be a product comparison task. If the input to the super-agent system 100 includes multiple candidate products with associated specifications, prices, or reviews, the output generated by the system may be a comparative analysis, ranking, or scorecard highlighting trade-offs across features, cost, and quality.

As another example, the task may be a budget alignment task. If the input to the super-agent system 100 includes a spending limit, financing options, or cost constraints, the output generated by the super-agent system 100 may be recommendations that fit within the budget, along with adjustments or alternatives to balance price and value.

As another example, the task may be a purchase timing optimization task. If the input to the super-agent system 100 includes pricing history, promotional cycles, or inventory signals, the output generated by the super-agent system 100 may be guidance on when to purchase, including anticipated discounts, optimal buying windows, or urgency assessments.

As another example, the task may be a purchasing decision optimization task. If the input to the super-agent system 100 includes user priorities such as quality, sustainability, delivery speed, or warranty considerations, the output generated by the super-agent system 100 may be a final purchase recommendation or prioritized action plan that optimizes overall satisfaction under the given constraints.

In some implementations, the task can be an education planning task, including learner assessment, curriculum design, pathway recommendation, progress tracking, and optimization of educational outcomes aligned with learner goals and constraints. For example, the task may be a learner assessment task. If the input to the super-agent system 100 includes academic history, assessment results, or self-reported competencies, the output generated by the super-agent system 100 may be an evaluation of current knowledge levels, skill gaps, or readiness for specific learning objectives.

As another example, the task may be a curriculum planning task. If the input to the super-agent system 100 includes learning goals, prerequisite requirements, and time or resource constraints, the output generated by the super-agent system 100 may be a structured curriculum, course sequence, or study plan designed to achieve the specified objectives.

As another example, the task may be an education pathway recommendation task. If the input to the super-agent system 100 includes a learner's current status and target credentials or competencies, the output generated by the super-agent system 100 may be recommended programs, certifications, or progression pathways aligned with the learner's goals.

As another example, the task may be a learning progress tracking and evaluation task. If the input to the super-agent system 100 includes ongoing performance data, completion records, or engagement metrics, the output generated by the super-agent system 100 may be progress indicators, feedback reports, or adaptive adjustments to the education plan.

As another example, the task may be an educational outcome optimization task. If the input to the super-agent system 100 includes constraints such as time, cost, or learning preferences, together with performance feedback, the output generated by the super-agent system 100 may be recommendations or interventions intended to improve learning efficiency and outcome attainment.

In some implementations, the task can be an entertainment recommendation task, including content discovery, personalization, and ranking of entertainment options aligned with user interests and contextual constraints. For example, the task may be a content discovery task. If the input to the super-agent system 100 includes user preferences, prior consumption history, or stated interests, the output generated by the super-agent system 100 may be a set of entertainment options, such as movies, music, games, or live events, that match the user's tastes.

As another example, the task may be a personalization and ranking task. If the input to the super-agent system 100 includes a catalog of available content and a user preference model, the output generated by the super-agent system 100 may be a ranked list of entertainment items optimized for relevance, diversity, or engagement.

As another example, the task may be a contextual recommendation task. If the input to the super-agent system 100 includes contextual factors such as time, location, device type, or social setting, the output generated by the super-agent system 100 may be recommendations tailored to the user's current context.

As another example, the task may be a feedback-driven recommendation refinement task. If the input to the super-agent system 100 includes user feedback, engagement outcomes, or consumption results, the output generated by the super-agent system 100 may be updated recommendation models or adjusted rankings to improve future recommendation quality.

In some implementations, the task can be a travel planning task, including destination selection, itinerary construction, transportation and accommodation optimization, budgeting, and alignment with traveler preferences and constraints. For example, the task may be a destination selection task. If the input to the super-agent system 100 includes travel objectives, preferred activities, seasonal constraints, or geographic limitations, the output generated by the super-agent system 100 may be a set of recommended destinations or regions ranked according to suitability.

As another example, the task may be an itinerary construction task. If the input to the super-agent system 100 includes trip duration, points of interest, and pacing preferences, the output generated by the super-agent system 100 may be a structured itinerary specifying daily activities, sequencing, and time allocations.

As another example, the task may be a transportation optimization task. If the input to the super-agent system 100 includes origin locations, travel dates, budget constraints, and mode preferences, the output generated by the super-agent system 100 may be recommended transportation options, routes, or schedules optimized for cost, time, or convenience.

As another example, the task may be an accommodation planning task. If the input to the super-agent system 100 includes lodging preferences, group size, location constraints, and budget, the output generated by the super-agent system 100 may be a shortlist of accommodations or booking strategies aligned with the traveler's requirements.

As another example, the task may be a travel budget and constraint management task. If the input to the super-agent system 100 includes overall budget limits, regulatory requirements, or personal constraints such as visas or accessibility needs, the output generated by the super-agent system 100 may be a consolidated plan or recommendations ensuring feasibility and compliance across all aspects of the trip.

In some implementations, the task can be a business task, including market analysis, financial forecasting, operations optimization, customer support, or generating strategic recommendations for organizational decision-making. For example, the task may be a market analysis task. If the input to the agent system 100 includes industry data, competitive intelligence, customer segmentation information, or macroeconomic indicators, the output generated by the agent system 100 may be insights regarding market size, growth trends, competitive positioning, or opportunity identification.

As another example, the task may be a financial forecasting task. If the input to the agent system 100 includes historical financial statements, revenue drivers, cost structures, or planning assumptions, the output generated by the agent system 100 may be projected financial statements, revenue forecasts, cash-flow projections, or scenario analyses supporting planning and investment decisions.

As another example, the task may be an operations optimization task. If the input to the agent system 100 includes process metrics, resource constraints, supply chain data, or performance targets, the output generated by the agent system 100 may be recommendations for process improvements, resource allocation, or efficiency gains designed to optimize operational performance.

As another example, the task may be a customer support task. If the input to the agent system 100 includes customer inquiries, service histories, or support policies, the output generated by the agent system 100 may be responses, resolution recommendations, or workflow actions intended to address customer issues and improve satisfaction.

As another example, the task may be a strategic recommendation task. If the input to the agent system 100 includes organizational objectives, constraints, and internal and external data, the output generated by the agent system 100 may be strategic options, prioritized initiatives, or decision support analyses to guide executive or managerial decision-making.

Figure 2:
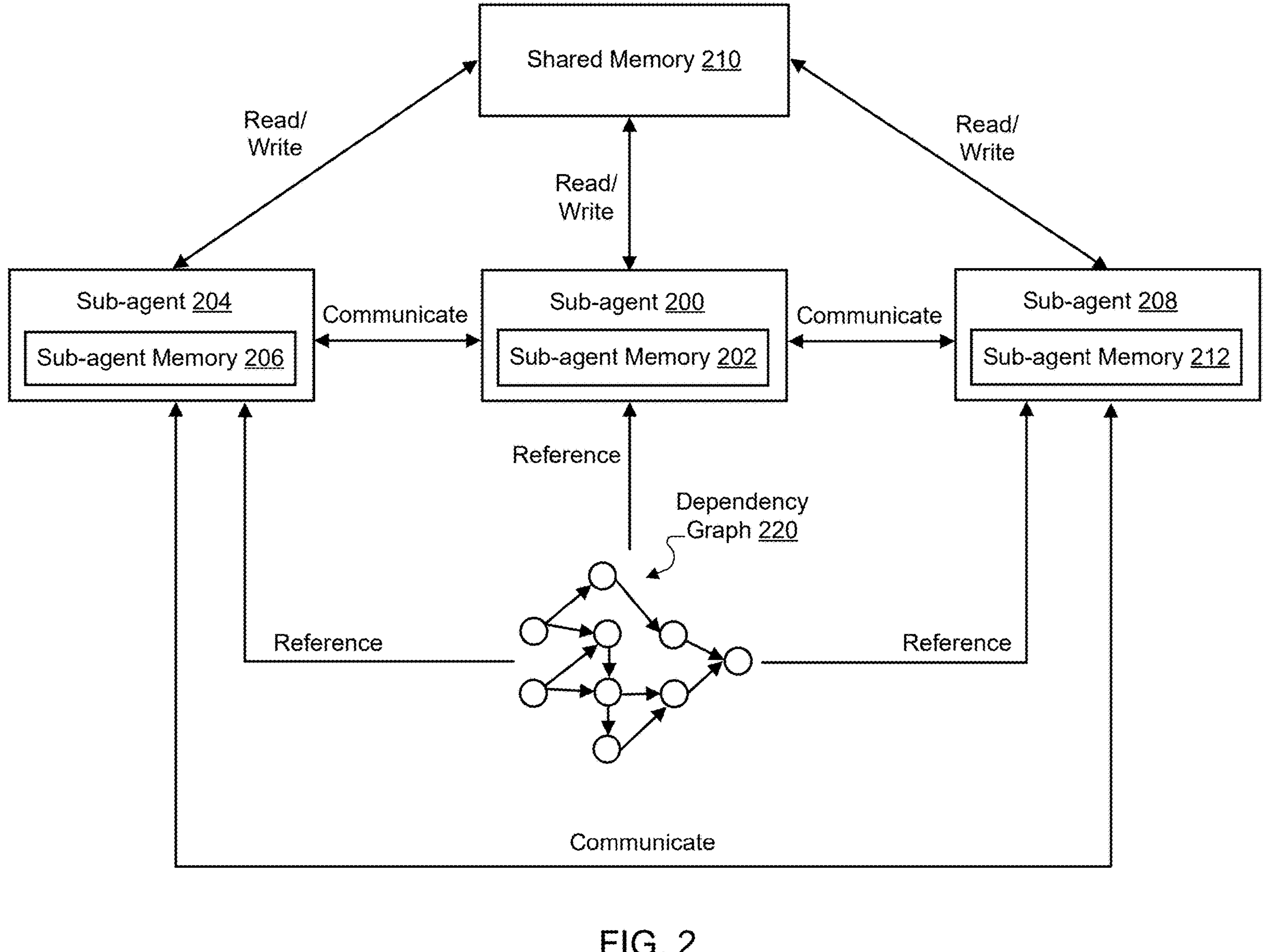
FIG. 2 shows an example of a plurality of sub-agents and their interactions based on a dependency graph using a shared memory.

FIG. 2 shows an example of a plurality of sub-agents and their interactions based on a dependency graph 220 using a shared memory 210. The example of the plurality of sub-agents has three sub-agents and includes a sub-agent 204 with a sub-agent memory 206, a sub-agent 200 with a sub-agent memory 202, and a sub-agent 208 with a sub-agent memory 212.

During execution of the task, each sub-agent in the plurality of sub-agents (e.g., sub-agents 200, 204 and 208) use its sub-agent memory to store private working information while reading shared information from and writing shared information to the shared memory 210. For example, the sub-agent 200 uses the sub-agent memory 202 to store private working information while reading shared information from and writing shared information to the shared memory 210. In the dependency graph 220, when a sub-agent has one or more preceding sub-agents, the sub-agent waits for the one or more preceding sub-agents to complete their executions and receives their outputs before the sub-agent begins its executions. When a sub-agent has one or more succeeding sub-agents, the sub-agent sends its output to the one or more succeeding sub-agents. Communication between two sub-agents connected by an edge in the dependency graph 220, e.g. sub-agent 200 and sub-agent 204, follows the communication protocol described by the edge that connects the two sub-agents.

While FIG. 2 illustrates three sub-agents, the sub-agent system 100 can include any number of sub-agents that is greater than one. In addition, while FIG. 2 illustrates an example of the dependency graph 220 that has nine nodes and twelve edges, the dependency graph 220 can have any number of nodes and any number of edges.

Figure 3:
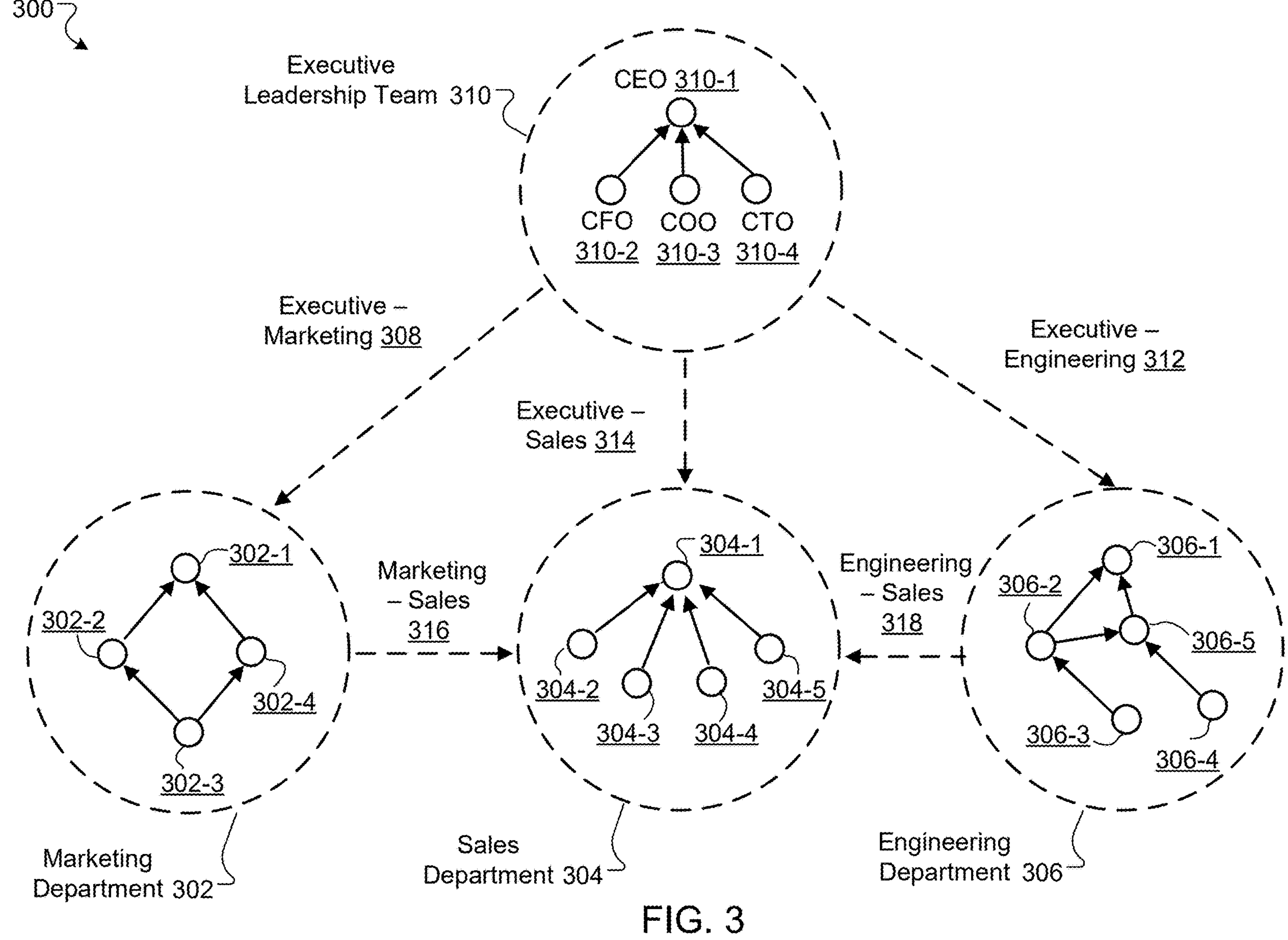
FIG. 3 shows an example of a dependency graph with super-nodes and super-edges.

FIG. 3 shows an example of a dependency graph with super-nodes and super-edges. In this example, the super-agent system 100 is configured to execute a task, for example, creating a yearly plan to improve revenue of a company. The super-agent 102 creates the dependency graph 300 for executing this task. The dependency graph 300 has four super-nodes representing an executive leadership team 310, a marketing department 302, a sales department 304, and an engineering department 306. This structure reflects the organizational structure of the company.

Interactions among the super-nodes follow communication protocols described by the super-edges. In particular, the executive leadership team 310 interacts with the marketing department 302 using a super-edge executive-marketing 308. The executive leadership team 310 interacts with the engineering department 306 using a super-edge executive-engineering 312. The executive leadership team 310 interacts with the sales department 304 using a super-edge executive-sales 314. Similarly, the engineering department 306 interacts with the sales department 304 using a super-edge engineering-sales 318. The marketing department 302 interacts with the sales department 304 using a super-edge marketing-sales 316.

As described by the dependency graph 300, to perform the task, the executive leadership team 310 forms an overall strategy to improve sales and delegates the execution to the marketing department 302, the engineering department 306, and the sales department 304. The marketing department 302 and the engineering department 306 support the sales department 304 in this overall strategy. For example, the engineering department 306 oversees a detailed plan for new products, and the marketing department 302 oversees a detailed plan to bring the new products to customers. With the detailed plans from the engineering department 306 and the marketing department 302, the sales department 304 will create a plan for sales to improve revenue for the company.

Within the executive leadership team 310, the dependency graph 300 has four nodes representing a CEO sub-agent 310-1, a CFO sub-agent 310-2, a COO sub-agent 310-3, and a CTO sub-agent 310-4. The sub-agents in the executive leadership team form their own dependency sub-graph in which the CEO sub-agent 310-1 depends on the work of the CFO sub-agent 310-2, the COO sub-agent 310-3, and the CTO sub-agent 310-4.

Similarly, within the marketing department 302, there are four sub-agents 302-1 to 302-4 acting as team members of the marketing department 302. Each of these sub-agents interacts with other sub-agents according to their own dependency sub-graph (i.e., the dependency sub-graphs of the sub-agents in the marketing department 302).

Within the sales department 304, there are five sub-agents 304-1 to 304-5 acting as team members of the sales department 304, each sub-agent interacts with each other according to their own dependency sub-graph (i.e., the dependency sub-graph of the sub-agents in the sales department 304).

Within the engineering department 306, there are five sub-agents 306-1 to 306-5, acting as team members of the engineering department 306. Each of the sub-agents interacts with other sub-agents according to their own dependency sub-graph (i.e., the dependency sub-graph of the sub-agents in the engineering department 306).

During the execution of the above task, the sub-agents in the dependency graph 300 can discover new findings or risks worth notifying or escalating to the executive leadership team 310. In some implementations, the sub-agents can notify and escalate these matters to the executive leadership team 310 by direct communication with the sub-agents in the executive leadership team 310. In some other implementations, the sub-agents can notify and escalate these matters to the executive leadership team 310 using a shared memory that is accessible to all sub-agents (e.g., the shared memory 210 described in FIG. 2).

Figure 4:
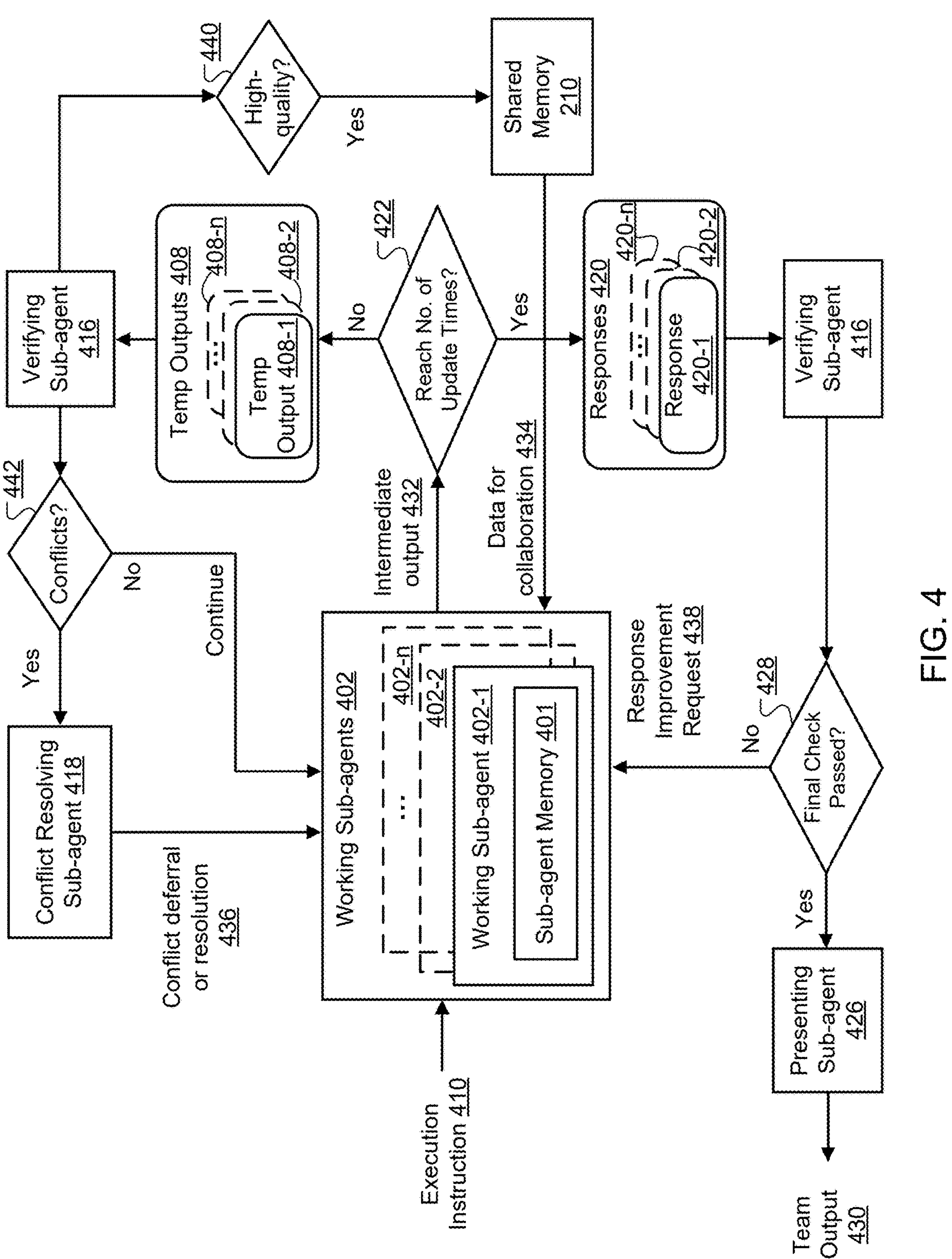
FIG. 4 shows an example workflow of sub-agents for generating a team output.

FIG. 4 shows an example workflow of a plurality of sub-agents (e.g., the plurality of sub-agents 126 in FIG. 1) for generating a team output 430 based on an execution instruction 410. Similar to the execution instruction 124 in FIG. 1, the execution instruction 410 is sent from a super-agent (e.g., the super-agent 102 in FIG. 1) to the plurality of sub-agents. The plurality of sub-agents includes a plurality of working sub-agents 402 (e.g., working sub-agents 402-1, 402-2, . . . , 402-*n*), a verifying sub-agent 416, a conflict-resolving sub-agent 418, and a presenting sub-agent 426. In particular, the plurality working sub-agents 402 coordinate with each other according to their roles and expertise defined in their prompts based on a dependency graph (e.g., the dependency graph 118 in FIG. 1). Thus, by using the plurality of working sub-agents 402, the super-agent system can decompose a complex task into smaller, more manageable sub-tasks (e.g., one sub-task for each working sub-agent) by allowing each working sub-agent to focus only on the information relevant to its specialization. The verifying sub-agent 416 is a specialized sub-agent in the plurality of sub-agents, which is configured to check the correctness and quality of work performed by the plurality of working sub-agents 402. The conflict resolving sub-agent 418 is another specialized sub-agent in the plurality of sub-agents, which is configured to resolve conflicts in the work performed by the plurality of working sub-agents 402. The presenting sub-agent 426 is another specialized sub-agent in the plurality of sub-agents, which is configured to combine outputs from the plurality of working sub-agents 402 to generate the team output 430.

The execution instruction 410 includes a signal that allows each of the sub-agents to start its operations based on its sub-agent prompt. In some implementations, if the super-agent receives a response revision request from the response benchmarking engine 154 of the super-agent system 100 (e.g., the response revision request 156 in FIG. 1), the execution instruction 410 further includes the response revision request.

As described in FIG. 1, each working sub-agent in the plurality of working sub-agent 402 has a temporary output stored in the working sub-agent's memory, which is initially empty, for maintaining the working sub-agent's own response to the task. For example, the working sub-agents 402-1, 402-2, . . . , 402-*n* have temporary outputs 408-1, 408-2, . . . , 408-*n*, respectively, with $n \geq 2$.

In response to receiving the execution instruction 410, each working sub-agent is configured to perform the assigned sub-task by running its sub-agent prompt to generate a respective intermediate output 432. Each working sub-agent then uses its respective intermediate output 432 to update its respective temporary output. The respective updated temporary output is a partial response of the working sub-agent to the respective sub-task. If a working sub-agent has updated its respective temporary output for a pre-defined number of update times (step 422), the working sub-agent stops updating and assigns its most recently updated temporary output as a response to the assigned sub-task of the working sub-agent. For example, after the pre-defined number of update times, the working sub-agents 402-1, 402-2, . . . , 402-*n* obtain responses 420-1, 420-2, . . . , 420-*n*, respectively, with $n \geq 2$, collectively referred to as a plurality of responses 420.

In some implementations, after the plurality of working sub-agents 402 updates the plurality of temporary outputs 408 in each update time, the verifying agent 416 is configured to detect conflicting partial responses of two or more temporary outputs from the plurality of temporary outputs 408 (step 442). In response to a detection of the conflicting partial responses, the conflict-resolving sub-agent 418 generates a course of action to address the conflicting partial responses. After that, the conflict-resolving sub-agent 418 communicates the course of action to two or more working sub-agents associated with the conflicting partial responses. The course of action for addressing the conflicting partial responses can be one of (i) resolving the conflicting partial responses to generate a resolution, or (ii) deferring resolving the conflicting partial responses to the next update time.

The conflict-resolving sub-agent 418 can resolve the conflicting partial responses to generate a resolution by applying one or more conflict resolution mechanisms. The one or more conflict resolutions may include one or more of a confidence-based selection, consensus or majority voting, hierarchical arbitration by a supervisory model, weighted merging of responses, constraint-based filtering, or iterative refinement to reconcile discrepancies.

The conflict-resolving sub-agent 418 can defer resolving the same conflicting partial responses up to a predetermined number of times. After the conflict-resolving sub-agent 418 has deferred resolving the same conflicting partial responses for the predetermined number of times, the conflict-resolving sub-agent 418 is configured to resolve the conflicting partial responses to generate a resolution.

In some implementations, after the plurality of working sub-agents 402 update of the plurality of temporary outputs 408 in each update time, the verifying agent 416 determines that a temporary output in the plurality of temporary outputs 408 has a quality exceeding a threshold quality (step 440), representing an interesting finding that should be known by all working sub-agents. Subsequently, the super-agent system 100 writes the determined temporary output having high quality to the shared memory 210 for reasoning in the next update time.

By incorporating the verifying sub-agent 416 and the conflict-resolving sub-agent 418, the super-agent system can substantially improve the quality of generated outputs in comparison to existing multi-agent systems. Specifically, the verifying sub-agent 416 can identify a high-quality partial response produced by one of the sub-agents and then broadcasts this information to the entire team via the shared memory 210. By integrating this high-quality partial response into all sub-agents' subsequent reasoning, all sub-agents can generate higher-quality partial responses in the next execution iterations and substantially accelerate the generation of their final outputs. At the same time, the verifying sub-agent 416 can identify conflicting partial responses from a subset of sub-agents and to delegate a resolution to the conflict-resolving sub-agent 418. This collaboration reduces inconsistencies early, substantially improving the quality of the final system output. Furthermore, resolving conflicts at an early stage prevents cascading errors and unnecessary repeated computations, resulting in more efficient use of resources for long and/or complex tasks.

After the plurality of responses 420 from the plurality of working sub-agents 402 have been obtained, the verifying agent 416 updates one or more values of one or more check criteria (step 428) based on the plurality of responses 420. The one or more check criteria may include criteria that measure correctness and quality of the plurality of responses 420, for example factual accuracy, logical consistency, completeness with respect to task requirements, relevance to the prompt, adherence to specified constraints or formats, linguistic clarity, and internal coherence.

If the updated one or more values of the one or more check criteria are not satisfied, the super-agent system 100 sends a response improvement request 438 to the plurality of working sub-agents 402 to re-run the above steps and improve the plurality of responses 420 (i.e. each working sub-agent in the plurality of working sub-agents 402 performing the assigned sub-task by running its sub-agent prompt, updating its respective temporary output for the pre-defined number of update times; for each update time: the verifying agent 416 detecting conflicts and the conflict resolving sub-agent 418 resolving conflicts, the verifying agent 416 detecting one or more high quality temporary outputs to write to the shared memory 210; obtaining a plurality of responses from the plurality of working sub-agents 402 after the pre-defined number of update times; the verifying sub-agent 416 updating one or more values of one or more check criteria). If the updated one or more values of the one or more check criteria are satisfied, the presenting sub-agent 426 combines the plurality of satisfied responses 420 from the plurality of working sub-agents 402 to generate the team output 430.

Figure 5:
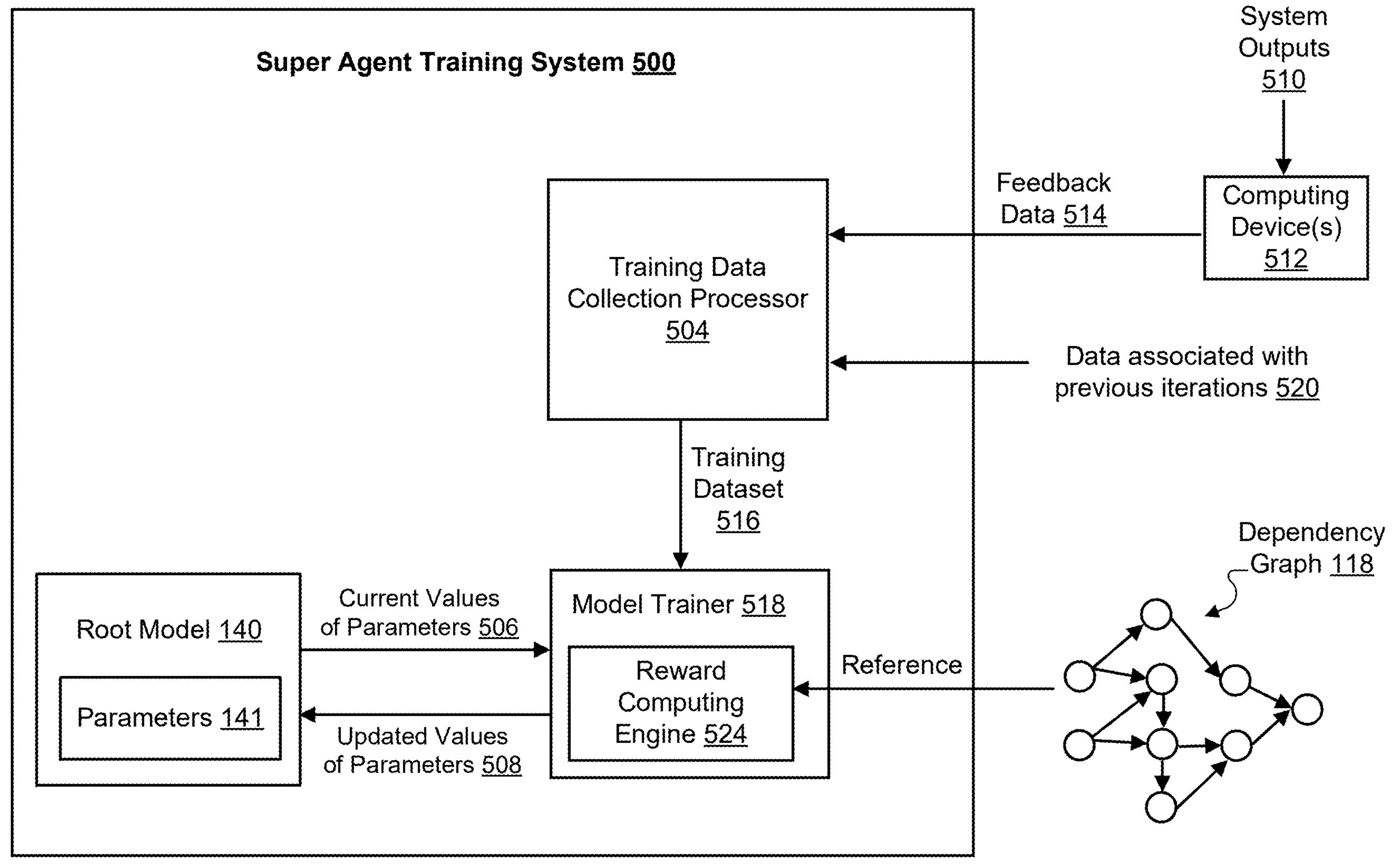
FIG. 5 illustrates an example super-agent training system for training a root model.

FIG. 5 illustrates an example super-agent training system 500 for training a root model 140. The super-agent training system 500 includes a training data collection processor 504 and a model trainer 518. The training data collection processor 504 is configured to receive feedback data 514 from one or more computing devices 512 and data associated with previous iterations 520. The feedback data 514 indicates feedback and engagement activities from one or more users interacting with one or more system outputs 510. Each system output in the one or more system outputs 510 is similar to the system output 160 in FIG. 1.

In some implementations, the feedback and engagement activities include one or more of: like of a system output, dislike of a system output, share of a system output, hide of a system output, regeneration of a system output, correction of information presented in a system output, providing an improvement over a system output, taking recommended actions from a system output such as going to a commercial platform, adding an item to a shopping cart, purchase of an item, sale of an item, taking a learning course, applying for a job, taking a job offer, trading a stock, optimizing a stock portfolio, checking bank account balance, starting a house hunting, scheduling a house visit, listing a property, contacting a real estate agent, leasing a property, renting a property, searching for a real estate deal, purchasing a property, sale of a property, planning a travel, booking tickets, booking hotels, booking an experience, pitching an client, buying inventory, allocating resources for activities in an organization, or pursuing an M&A deal.

The data associated with previous iterations 520 includes historical information of one or more previous system inputs, previous system outputs, and executions performed by the super-agent and a plurality of previous sub-agents from one or more previous iterations in the plurality of iterations.

The root model 140 has a plurality of parameters 141.

The training data collection processor 504 is configured to create training dataset 516 from the feedback data 514 and the data associated with previous iterations 520. The training data 516 includes a plurality of training samples. Each training sample is associated with a previous iteration and includes:

- a previous system input and a previous system output,
- a previous sub-agent team configuration including a previous plurality of sub-agent configurations and a previous dependency graph,
- previous execution data of (i) the super-agent, (ii) a previous plurality of sub-agents, and (iii) a previous baseline agent, and
- a comparison between a previous team output and a previous baseline output.

The model trainer 518 is configured to train the root model 140 on the training dataset 516 using a training technique to generate updated values 508 from current values 506 of the plurality of parameters 141.

In some implementations, the training technique includes at least one of a supervised training technique, an unsupervised training technique, a self-supervised training technique, or a semi-supervised training technique.

In some implementations, the training technique is a reinforcement learning technique. The reinforcement learning technique includes computing rewards for the super-agent and for each sub-agent of the plurality of sub-agents based on the dependency graph.

In particular, the model trainer 518 includes a reward computing engine 524 configured to compute rewards during training. The reward computing engine 524 is a software-based system, subsystem, or process that is programmed to perform one or more specific functions as described below. The reward computing engine 524 will be implemented as one or more software modules or components, installed on one or more computers in one or more locations.

The reward computing engine 524 is configured to compute rewards for the super-agent 102 and for each sub-agent of the plurality of sub-agents 126 based on the dependency graph 118. A reward for each of the plurality of sub-agents 126 measures the sub-agent's performance on its respective sub-task. A reward for the super-agent 102 measures the super-agent's performance on the task identified by the system input 150.

During training, the model trainer 518 is configured to update current values 506 of the plurality of parameters 141 to maximize an objective function that includes the rewards computed by the reward computing engine 524 based on the dependency graph 118.

The super-agent system 100 is configured to use the root model 140 in accordance with the updated values 508 of the plurality of parameters 141 for future system output generations. In particular, the super-agent system 100 sends the updated values of parameters of the root model to the super-agent 102 and each sub-agent of the plurality of sub-agents 126 to update the respective replica of the root model associated with the sub-agent. Therefore, both the sub-agent 102 and the plurality of sub-agents 126 use the updated values 508 of the plurality of parameters 141 for future system output generations.

Figure 6:
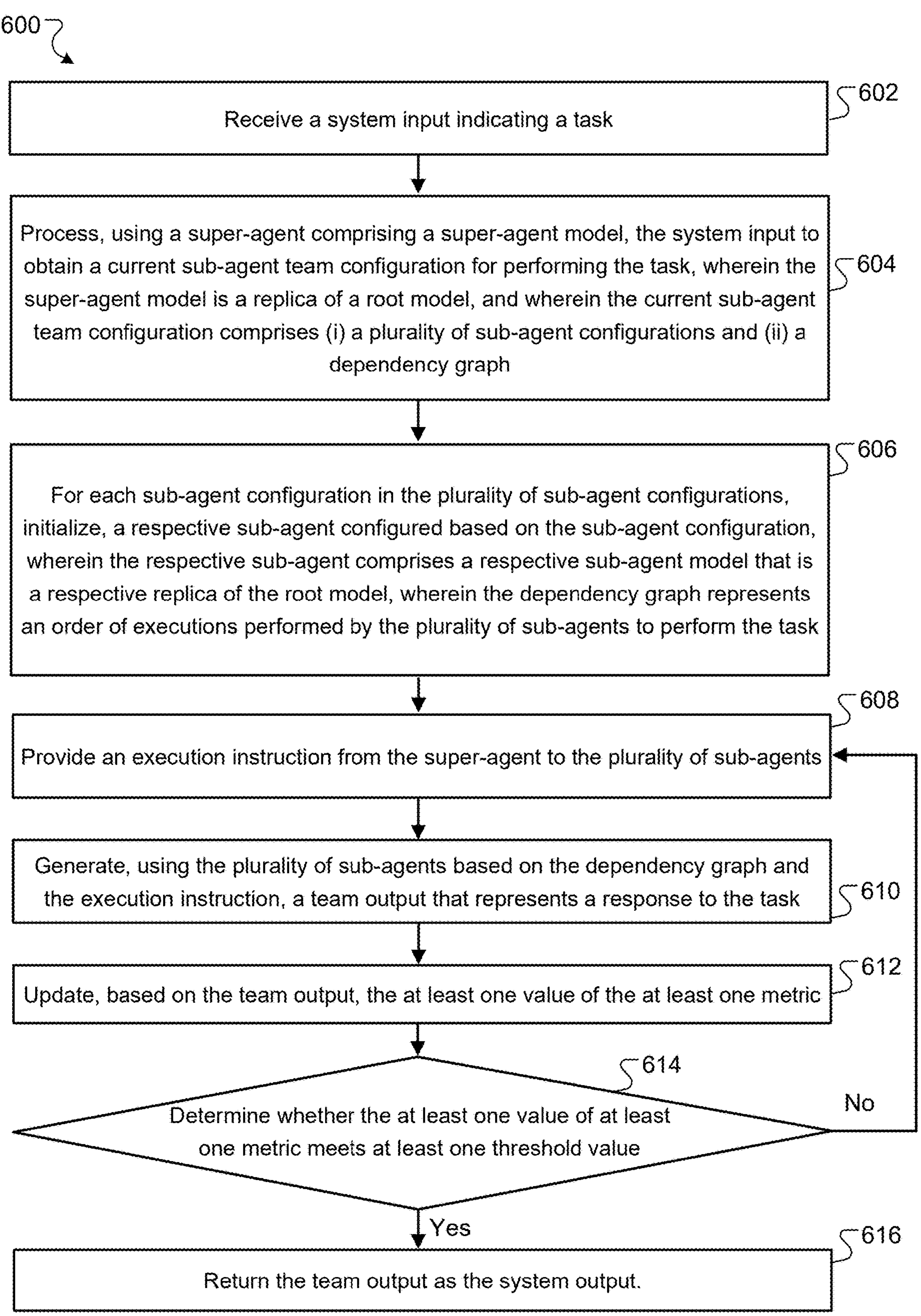
FIG. 6 is a flow diagram of an example process for generating a system output for a system input.

FIG. 6 is a flow diagram of an example process 600 for generating a system output for a system input. For convenience, the process 600 will be described as being performed by a system of one or more computers located in one or more locations. For example, a super-agent system, e.g., the super-agent system 100 of FIG. 1, appropriately programmed in accordance with this specification, can perform the process 600.

The system can perform the process 600 for multiple iterations.

The system receives a system input indicating a task (step 602).

In some implementations, the task includes one or more generative tasks from a plurality of generative tasks. The plurality of generative tasks includes, but is not limited to: a natural language understanding task, a reasoning task, a coding task, a software engineering task, a web-browsing task, a reinforcement learning task, a robotic control task, a planning and decision-making task, a research task, a dialogue and multi-turn interaction task, a tool-use task, a safety evaluation task, a multi-modal reasoning task, a career planning task, a financial planning task, a real estate planning task, a shopping planning task, an education planning task, an entertainment recommendation task, a travel planning task, and a business task.

The system processes, using a super-agent including a super-agent model, the system input to obtain a current sub-agent team configuration for performing the task, wherein the super-agent model is a replica of a root model, and wherein the current sub-agent team configuration includes (i) a plurality of sub-agent configurations and (ii) a dependency graph (step 604).

In some implementations, the root model is a machine learning model. For example, the root model is a generative neural network, e.g., a Large Language Model (LLM).

In some implementations, each sub-agent configuration in the plurality of sub-agent configurations includes a sub-agent model description, a sub-agent prompt, and a sub-agent tools description. In some implementations, the sub-agent model description includes a description of the root model. In some other implementations, the sub-agent model description includes a description of a model specified by the super-agent.

In some implementations, each sub-agent in the plurality of sub-agents includes: one or more sub-agent tools, a sub-agent prompt indicating (i) a role and expertise of the sub-agent, (ii) one or more behavioral directives for the sub-agent, (iii) instructions for using the one or more sub-agent tools, and (iv) instructions for communicating and working with other sub-agents, and a sub-agent memory. Each sub-agent in the plurality of sub-agents is configured to access a shared memory.

In some implementations, the dependency graph includes: a plurality of nodes, each node representing a sub-agent in the plurality of sub-agents, and a plurality of edges. Each edge in the plurality of edges connects two nodes in the plurality of nodes and specifies a communication protocol between two sub-agents represented by the two nodes. The dependency graph specifies, for each sub-agent represented by a corresponding node, at least one of (i) one or more parent nodes representing one or more preceding sub-agents that are configured to complete their executions before the sub-agent begins its executions, or (ii) one or more child nodes representing one or more succeeding sub-agents that are configured to receive outputs of the sub-agent as inputs.

In some implementations, the dependency graph includes: a plurality of super-nodes and a plurality of super-edges. Each super-node in the plurality of super-nodes includes one or more nodes in the plurality of nodes and represents an organization of one or more sub-agents represented by the one or more nodes, and a plurality of super-edges. Each super-edge in the plurality of super-edge connects two super-nodes in the plurality of super-nodes and specifies a communication protocol between two organizations represented by the two super-nodes.

For each sub-agent configuration in the plurality of sub-agent configurations, the system initializes, a respective sub-agent configured based on the sub-agent configuration (step 606).

The respective sub-agent includes a respective sub-agent model that is a respective replica of the root model. The dependency graph represents an order of executions performed by the plurality of sub-agents to perform the task.

The system performs steps 608-614 for one or more times until at least one value of at least one metric meets at least one threshold value.

The system provides an execution instruction from the super-agent to the plurality of sub-agents (step 608).

In some implementations, the system input includes a task context. The task context includes a team setup request to load or modify a sub-agent team configuration, an initial instruction to execute the task, and historical information of one or more previous system inputs, previous system outputs, and executions performed by the super-agent and a plurality of previous sub-agents from one or more previous iterations in the plurality of iterations.

In some implementations, the system provides the execution instruction from the super-agent to the plurality of sub-agents by generating, using the super-agent based on the initial instruction, the execution instruction, and providing the generated execution instruction to the plurality of sub-agents.

The system generates, using the plurality of sub-agents based on the dependency graph and the execution instruction, a team output that represents a response to the task (step 610).

In some implementations, the plurality of sub-agents includes a plurality of working sub-agents, a verifying sub-agent, a conflict-resolving sub-agent, and a presenting sub-agent. The system generates, using the plurality of sub-agents based on the dependency graph and the execution instruction, the team output that represents the response to the task by:

- receiving, using the plurality of working sub-agents, the execution instruction from the super-agent,
- initializing, using each working sub-agent of the plurality of working sub-agents, a temporary output,
- performing the following steps for one or more times until one or more values of one or more check criteria are satisfied:
  - repeating the following updating steps for a plurality of update times:
    - processing, using each working sub-agent of the plurality of working sub-agents according to the sub-agent prompt of the working sub-agent and following the order of executions represented by the dependency graph, the execution instruction to update the temporary output of the working sub-agent
    - detecting, using the verifying agent, conflicting partial responses of two or more temporary outputs from the temporary outputs,
    - in response to a detection of the conflicting partial responses, generate, using a conflict-resolving sub-agent, a course of action to address the conflicting partial responses, and
    - communicating the course of action to two or more working sub-agents associated with the conflicting partial responses, and
  - obtaining, for each working sub-agent of the plurality of working sub-agents, a response to the task based on the updated temporary output of the working sub-agent, and
  - updating, using the verifying agent based on the responses from the plurality of working sub-agents, the one or more values of the one or more check criteria, and
- processing, using the presenting sub-agent, the responses from the plurality of working sub-agents to generate the team output.

In some implementations, the course of action for addressing the conflicting partial responses includes one of: resolving, using the conflict-resolving sub-agent, the conflicting partial responses to generate a resolution, or deferring, using the conflict-resolving sub-agent, resolving the conflicting partial responses to the next update time, in which the conflict-resolving sub-agent is configured to defer resolving the same conflicting partial responses up to a predetermined number of times.

In some implementations, while repeating the updating steps for the plurality of update times, the system determines, by the verifying sub-agent, that a temporary output in the temporary outputs has a quality exceeding a threshold quality, and writes the determined temporary output to the shared memory accessible to the plurality of sub-agents in the next update time.

In some implementations, to further improve the performance of the system on the task, the system initializes, using the super-agent, a baseline agent to execute the same task indicated by the system input. The system processes, using the super-agent, the system input to generate a baseline execution instruction. The system executes, using the baseline agent, the baseline execution instruction to generate a baseline output.

In some implementations, the system executes, using the baseline agent, the baseline execution instruction to generate the baseline output by receiving an external benchmark for the task, and processing, using the baseline agent, the external benchmark to generate the baseline output. In some implementations, the external benchmark is one of a ground-truth output for the task or user feedback.

The system updates, based on the team output, the at least one value of the at least one metric (step 612).

In some implementations, the system updates, based on the team output, the at least one value of the at least one metric by updating, using a response benchmarking engine, the at least one value of the at least one metric based on the team output and the baseline output. When the at least one value of the at least one metric does not meet the at least one threshold value, the system updates, using the super-agent, the sub-agent team configuration.

The system determines whether the at least one value of at least one metric meets the at least one threshold value (step 614).

In response to determining that the at least one value of at least one metric does not meet the at least one threshold value, the system repeats steps 608-614.

In response to determining that the at least one value of at least one metric meets the at least one threshold value, the system returns the team output as the system output (step 616).

In some implementations, the system trains the root model on a training dataset using a machine learning technique to update values of parameters of the root model. The training dataset includes a plurality of training samples. Each training sample is associated with a previous iteration and includes:

- a previous system input and a previous system output,
- a previous sub-agent team configuration including a previous plurality of sub-agent configurations and a previous dependency graph,
- previous execution data of (i) the super-agent, (ii) a previous plurality of sub-agents, and (iii) a previous baseline agent, and
- a comparison between a previous team output and a previous baseline output.

The system sends the updated values of parameters of the root model to each sub-agent of the plurality of sub-agents to update the respective replica of the root model associated with the sub-agent.

In some implementations, the machine learning technique is at least one of a supervised training technique, an unsupervised training technique, a self-supervised training technique, or a semi-supervised training technique.

In some implementations, the machine learning technique is a reinforcement learning technique. The reinforcement learning technique includes computing rewards for the super-agent and for each sub-agent of the plurality of sub-agents based on the dependency graph.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network.

Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method performed by one or more computers for generating a system output for a system input, the method comprising performing the following task operations:

receiving a system input indicating a task;

processing, using a super-agent comprising a super-agent model, the system input to obtain a current sub-agent team configuration for performing the task, wherein the super-agent model is a replica of a root model, and wherein the current sub-agent team configuration comprises (i) a plurality of sub-agent configurations and (ii) a dependency graph;

for each sub-agent configuration in the plurality of sub-agent configurations, initializing, a respective sub-agent configured based on the sub-agent configuration, wherein the respective sub-agent comprises a respective sub-agent model that is a respective replica of the root model, wherein the dependency graph represents an order of executions performed by the plurality of sub-agents to perform the task;

performing the following steps for one or more times until at least one value of at least one metric meets at least one threshold value:

providing an execution instruction from the super-agent to the plurality of sub-agents, generating, using the plurality of sub-agents based on the dependency graph and the execution instruction, a team output that represents a response to the task, and updating, based on the team output, the at least one value of the at least one metric; and returning the team output as the system output.

2. The method of claim 1, wherein the root model is a generative neural network.

3. The method of claim 1, wherein the task comprises at least one generative task of a plurality of generative tasks comprising: a natural language understanding task, a reasoning task, a coding task, a software engineering task, a web-browsing task, a reinforcement learning task, a robotic control task, a planning and decision-making task, a research task, a dialogue and multi-turn interaction task, a tool-use task, a safety evaluation task, a multi-modal reasoning task, a career planning task, a financial planning task, a real estate planning task, a shopping planning task, an education planning task, an entertainment recommendation task, a travel planning task, and a business task.

4. The method of claim 1, further comprising performing the task operations at each iteration of a plurality of iterations, wherein at each iteration, the system input comprises a task context that comprises:

a team setup request to load or modify a sub-agent team configuration, an initial instruction to execute the task, and historical information of one or more previous system inputs, previous system outputs, and executions performed by the super-agent and a plurality of previous sub-agents from one or more previous iterations in the plurality of iterations.

5. The method of claim 4, wherein providing the execution instruction from the super-agent to the plurality of sub-agents comprises:

generating, using the super-agent based on the initial instruction, the execution instruction, and providing the generated execution instruction to the plurality of sub-agents.

6. The method of claim 1, wherein each sub-agent configuration in the plurality of sub-agent configurations comprises a sub-agent model description, a sub-agent prompt, and a sub-agent tools description.

7. The method of claim 6, wherein the sub-agent model description comprises a description of the root model.

8. The method of claim 6, wherein the sub-agent model description comprises a description of a model specified by the super-agent.

9. The method of claim 1, wherein each sub-agent in the plurality of sub-agents comprises:

one or more sub-agent tools, a sub-agent prompt indicating (i) a role and expertise of the sub-agent, (ii) one or more behavioral directives for the sub-agent, (iii) instructions for using the one or more sub-agent tools, and (iv) instructions for communicating and working with other sub-agents, and a sub-agent memory, and wherein each sub-agent in the plurality of sub-agents is configured to access a shared memory.

10. The method of claim 1, wherein the dependency graph comprises:

a plurality of nodes, each node representing a sub-agent in the plurality of sub-agents, and a plurality of edges, wherein each edge in the plurality of edges connects two nodes in the plurality of nodes and specifies a communication protocol between two sub-agents represented by the two nodes, and wherein the dependency graph specifies, for each sub-agent represented by a corresponding node, at least one of (i) one or more parent nodes representing one or more preceding sub-agents that are configured to complete their executions before the sub-agent begins its executions, or (ii) one or more child nodes representing one or more succeeding sub-agents that are configured to receive outputs of the sub-agent as inputs.

11. The method of claim 10, wherein the dependency graph comprises:

a plurality of super-nodes, wherein each super-node in the plurality of super-nodes comprises one or more nodes in the plurality of nodes and represents an organization of one or more sub-agents represented by the one or more nodes, and a plurality of super-edges, wherein each super-edge in the plurality of super-edge connects two super-nodes in the plurality of super-nodes and specifies a communication protocol between two organizations represented by the two super-nodes.

12. The method of claim 9, wherein the plurality of sub-agents comprises a plurality of working sub-agents, a verifying sub-agent, a conflict-resolving sub-agent, and a presenting sub-agent, and wherein generating, using the plurality of sub-agents based on the dependency graph and the execution instruction, the team output that represents the response to the task comprises:

receiving, using the plurality of working sub-agents, the execution instruction from the super-agent, initializing, using each working sub-agent of the plurality of working sub-agents, a temporary output, performing the following steps for one or more times until one or more values of one or more check criteria are satisfied:

repeating the following updating steps for a plurality of update times:

processing, using each working sub-agent of the plurality of working sub-agents according to the sub-agent prompt of the working sub-agent and following the order of executions represented by the dependency graph, the execution instruction to update the temporary output of the working sub-agent, and obtaining, for each working sub-agent of the plurality of working sub-agents, a response to the task based on the updated temporary output of the working sub-agent, and updating, using the verifying agent based on the responses from the plurality of working sub-agents, the one or more values of the one or more check criteria, and processing, using the presenting sub-agent, the responses from the plurality of working sub-agents to generate the team output, wherein each sub-agent in the plurality of the sub-agents is configured to store its execution data in the sub-agent memory of the sub-agent, and wherein each sub-agent in the plurality of the sub-agents is configured to update the temporary output of the sub-agent based on data in both the sub-agent memory of the sub-agent and the shared memory.

13. The method of claim 12, wherein the temporary output of each working sub-agent comprises a partial response to the task, and wherein repeating the updating steps for the plurality of update times comprises:

detecting, using the verifying agent, conflicting partial responses of two or more temporary outputs from the temporary outputs, in response to a detection of the conflicting partial responses, generate, using a conflict-resolving sub-agent, a course of action to address the conflicting partial responses, and communicating the course of action to two or more working sub-agents associated with the conflicting partial responses.

14. The method of claim 13, wherein the course of action to address the conflicting partial responses comprises one of:

resolving, using the conflict-resolving sub-agent, the conflicting partial responses to generate a resolution, or deferring, using the conflict-resolving sub-agent, resolving the conflicting partial responses to the next update time, wherein the conflict-resolving sub-agent is configured to defer resolving the same conflicting partial responses up to a predetermined number of times.

15. The method of claim 12, wherein repeating the updating steps for the plurality of update times comprises:

determining, by the verifying sub-agent, that a temporary output in the temporary outputs has a quality exceeding a threshold quality, and writing the determined temporary output to the shared memory accessible to the plurality of sub-agents in the next update time.

16. The method of claim 1, wherein the task operations comprise:

initializing, using the super-agent, a baseline agent to execute the same task indicated by the system input;

processing, using the super-agent, the system input to generate a baseline execution instruction; and executing, using the baseline agent, the baseline execution instruction to generate a baseline output, and wherein updating, based on the team output, the at least one value of the at least one metric comprises:

updating, using a response benchmarking engine, the at least one value of the at least one metric based on the team output and the baseline output, and when the at least one value of the at least one metric does not meet the at least one threshold value, updating, using the super-agent, the sub-agent team configuration.

17. The method of claim 16, wherein executing, using the baseline agent, the baseline execution instruction to generate the baseline output comprises:

receiving an external benchmark for the task, and processing, using the baseline agent, the external benchmark to generate the baseline output.

18. The method of claim 17, wherein the external benchmark is one of a ground-truth output for the task or user feedback.

19. The method of claim 1, further comprising:

performing the task operations at each iteration of a plurality of iterations, training the root model on a training dataset using a machine learning technique to update values of parameters of the root model, wherein the training dataset comprises a plurality of training samples, wherein each training sample is associated with a previous iteration and comprises:

a previous system input and a previous system output, a previous sub-agent team configuration comprising a previous plurality of sub-agent configurations and a previous dependency graph, previous execution data of (i) the super-agent, (ii) a previous plurality of sub-agents, and (iii) a previous baseline agent, and a comparison between a previous team output and a previous baseline output, and sending the updated values of parameters of the root model to each sub-agent of the plurality of sub-agents to update the respective replica of the root model associated with the sub-agent.

20. The method of claim 19, wherein the machine learning technique is at least one of a supervised training technique, an unsupervised training technique, a self-supervised training technique, or a semi-supervised training technique.

21. The method of claim 19, wherein the machine learning technique is a reinforcement learning technique.

22. The method of claim 21, wherein the reinforcement learning technique comprises computing rewards for the super-agent and for each sub-agent of the plurality of sub-agents based on the dependency graph.

23. A system comprising:

one or more computers; and one or more storage devices communicatively coupled to the one or more computers, wherein the one or more storage devices store instructions that, when executed by the one or more computers, cause the one or more computers to perform the following operations at each of one or more iterations:

receiving a system input indicating a task;

processing, using a super-agent comprising a super-agent model, the system input to obtain a current sub-agent team configuration for performing the task, wherein the super-agent model is a replica of a root model, and wherein the current sub-agent team configuration comprises (i) a plurality of sub-agent configurations and (ii) a dependency graph;

for each sub-agent configuration in the plurality of sub-agent configurations, initializing, a respective sub-agent configured based on the sub-agent configuration, wherein the respective sub-agent comprises a respective sub-agent model that is a respective replica of the root model, wherein the dependency graph represents an order of executions performed by the plurality of sub-agents to perform the task;

performing the following steps for one or more times until at least one value of at least one metric meets at least one threshold value:

providing an execution instruction from the super-agent to the plurality of sub-agents, generating, using the plurality of sub-agents based on the dependency graph and the execution instruction, a team output that represents a response to the task, and updating, based on the team output, the at least one value of the at least one metric; and returning the team output as a system output.

24. One or more non-transitory computer-readable storage media storing instructions that, when executed by one or more computers, cause the one or more computers to perform the following operations at each of one or more iterations:

receiving a system input indicating a task;

processing, using a super-agent comprising a super-agent model, the system input to obtain a current sub-agent team configuration for performing the task, wherein the super-agent model is a replica of a root model, and wherein the current sub-agent team configuration comprises (i) a plurality of sub-agent configurations and (ii) a dependency graph;

for each sub-agent configuration in the plurality of sub-agent configurations, initializing, a respective sub-agent configured based on the sub-agent configuration, wherein the respective sub-agent comprises a respective sub-agent model that is a respective replica of the root model, wherein the dependency graph represents an order of executions performed by the plurality of sub-agents to perform the task;

performing the following steps for one or more times until at least one value of at least one metric meets at least one threshold value:

providing an execution instruction from the super-agent to the plurality of sub-agents, generating, using the plurality of sub-agents based on the dependency graph and the execution instruction, a team output that represents a response to the task, and updating, based on the team output, the at least one value of the at least one metric; and returning the team output as a system output.

* * * * *